United States Patent
Gazdzinski et al.

(10) Patent No.: US 9,781,110 B2
(45) Date of Patent: *Oct. 3, 2017

(54) COMPUTERIZED METHODS FOR LOCATION-BASED SERVICE PROVISION

(71) Applicant: West View Research, LLC, San Diego, CA (US)

(72) Inventors: Mark J. Gazdzinski, Newark, DE (US); Robert F. Gazdzinski, San Diego, CA (US)

(73) Assignee: WEST VIEW RESEARCH, LLC, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/470,775

(22) Filed: Mar. 27, 2017

(65) Prior Publication Data

US 2017/0201517 A1    Jul. 13, 2017

Related U.S. Application Data

(60) Division of application No. 14/645,235, filed on Mar. 11, 2015, now Pat. No. 9,607,280, which is a division
(Continued)

(51) Int. Cl.
*G06K 15/00* (2006.01)
*H04L 29/06* (2006.01)
(Continued)

(52) U.S. Cl.
CPC ...... *H04L 63/0876* (2013.01); *G06K 7/10297* (2013.01); *G06K 7/10366* (2013.01);
(Continued)

(58) Field of Classification Search
USPC ............................................... 235/383, 384
See application file for complete search history.

(56) References Cited

U.S. PATENT DOCUMENTS 3,388,376 A    6/1968 Magee
3,733,608 A    5/1973 McGhay et al.
(Continued)

FOREIGN PATENT DOCUMENTS

DE    3440177 A1    5/1986
DE    19709518 C1    3/1998
(Continued)

OTHER PUBLICATIONS

Abowd, Context-Awareness in Wearable and Ubiquitous Computing, IEEE, 1997.
(Continued)

*Primary Examiner* — Ahshik Kim
(74) *Attorney, Agent, or Firm* — Gazdzinski & Associates, PC

(57) ABSTRACT

Computerized methods useful for causing provision of user-specific services via one or more data network apparatus and user mobile device. In one embodiment, the method includes receiving user-specific location data (e.g., relating to a destination of travel or shipping desired by the user) from the user's mobile device via an electronic network proxy agent that acts as a proxy for multiple different users simultaneously, and automatically forwarding that received data to another computerized device to enable provision of the service relating to that user and location. In one variant, the user mobile device and the network proxy agent establish a secure session to facilitate transfer of the data to a network address or device specified in a secure user-specific account accessible to the proxy agent. In another variant, the mobile device interfaces with a kiosk at a point of departure to transfer the data.

30 Claims, 6 Drawing Sheets

Related U.S. Application Data of application No. 13/761,077, filed on Feb. 6, 2013, now Pat. No. 9,033,226, which is a continuation of application No. 13/604,511, filed on Sep. 5, 2012, now Pat. No. 8,413,887, which is a continuation of application No. 13/421,713, filed on Mar. 15, 2012, now Pat. No. 8,371,503, which is a continuation of application No. 12/284,492, filed on Sep. 22, 2008, now Pat. No. 8,205,788, which is a continuation of application No. 11/015,384, filed on Dec. 16, 2004, now Pat. No. 7,427,024.

(60) Provisional application No. 60/530,812, filed on Dec. 17, 2003.

(51) Int. Cl.

| | | |
|---|---|---|
| *G06K 7/10* | (2006.01) | |
| *G06K 19/077* | (2006.01) | |
| *G07F 17/12* | (2006.01) | |
| *G07B 17/00* | (2006.01) | |
| *G06Q 20/36* | (2012.01) | |
| *G06Q 20/40* | (2012.01) | |
| *G06Q 20/20* | (2012.01) | |
| *G06Q 10/08* | (2012.01) | |
| *G06Q 20/32* | (2012.01) | |

(52) U.S. Cl.
CPC ... *G06K 7/10425* (2013.01); *G06K 19/07762* (2013.01); *G06Q 10/0833* (2013.01); *G06Q 20/204* (2013.01); *G06Q 20/32* (2013.01); *G06Q 20/363* (2013.01); *G06Q 20/405* (2013.01); *G07B 17/00193* (2013.01); *G07B 17/00314* (2013.01); *G07F 17/12* (2013.01); *H04L 63/102* (2013.01); *G07B 2017/00225* (2013.01); *G07B 2017/00322* (2013.01)

(56) References Cited

U.S. PATENT DOCUMENTS

| | | |
|---|---|---|
| 4,050,063 A | 9/1977 | Schull |
| 4,075,632 A | 2/1978 | Baldwin et al. |
| 4,114,027 A | 9/1978 | Slater et al. |
| 4,251,798 A | 2/1981 | Swartz et al. |
| 4,360,798 A | 11/1982 | Swartz et al. |
| 4,369,361 A | 1/1983 | Swartz et al. |
| 4,387,297 A | 6/1983 | Swartz et al. |
| 4,401,971 A | 8/1983 | Saito et al. |
| 4,409,470 A | 10/1983 | Shepard et al. |
| 4,460,120 A | 7/1984 | Shepard et al. |
| 4,534,056 A | 8/1985 | Feilchenfeld et al. |
| 4,558,300 A | 12/1985 | Goldman |
| 4,577,177 A | 3/1986 | Marubashi |
| 4,623,874 A | 11/1986 | Thoma |
| 4,691,202 A | 9/1987 | Denne et al. |
| 4,692,769 A | 9/1987 | Gegan |
| 4,708,224 A | 11/1987 | Schrooder |
| 4,749,062 A | 6/1988 | Tsuji et al. |
| 4,819,174 A | 4/1989 | Furuno et al. |
| 4,868,915 A | 9/1989 | Anderson, III et al. |
| 4,926,182 A | 5/1990 | Ohta et al. |
| 4,935,962 A | 6/1990 | Austin |
| 4,954,959 A | 9/1990 | Moroto et al. |
| 4,970,655 A | 11/1990 | Winn et al. |
| 4,979,593 A | 12/1990 | Watanabe et al. |
| 4,995,479 A | 2/1991 | Fujiwara et al. |
| 5,035,563 A | 7/1991 | Mezey |
| 5,038,283 A | 8/1991 | Caveney |
| 5,042,620 A | 8/1991 | Yoneda et al. |
| 5,053,774 A | 10/1991 | Schuermann et al. |
| 5,055,968 A | 10/1991 | Nishi et al. |
| 5,056,629 A | 10/1991 | Tsuji et al. |
| 5,079,411 A | 1/1992 | Lee |
| 5,086,450 A | 2/1992 | Kitagawa et al. |
| 5,121,407 A | 6/1992 | Partyka et al. |
| 5,155,689 A | 10/1992 | Wortham |
| 5,159,163 A | 10/1992 | Bahjat et al. |
| 5,182,570 A | 1/1993 | Nysen et al. |
| 5,200,583 A | 4/1993 | Kupersmith et al. |
| 5,202,552 A | 4/1993 | Little et al. |
| 5,255,341 A | 10/1993 | Nakajima |
| 5,274,560 A | 12/1993 | LaRue |
| 5,287,266 A | 2/1994 | Malec et al. |
| 5,293,029 A | 3/1994 | Iijima |
| 5,295,064 A | 3/1994 | Malec et al. |
| 5,304,786 A | 4/1994 | Pavlidis et al. |
| 5,319,181 A | 6/1994 | Shellhammer et al. |
| 5,320,561 A | 6/1994 | Cook et al. |
| 5,331,176 A | 7/1994 | Sant'Anselmo et al. |
| 5,334,974 A | 8/1994 | Simms et al. |
| 5,374,930 A | 12/1994 | Schuermann |
| 5,406,490 A | 4/1995 | Braegas |
| 5,414,432 A | 5/1995 | Penny, Jr. et al. |
| 5,414,439 A | 5/1995 | Groves et al. |
| 5,444,444 A | 8/1995 | Ross |
| 5,446,447 A | 8/1995 | Carney et al. |
| 5,448,110 A | 9/1995 | Tuttle et al. |
| 5,450,086 A | 9/1995 | Kaiser |
| 5,463,209 A | 10/1995 | Figh et al. |
| 5,465,099 A | 11/1995 | Mitsui et al. |
| 5,467,099 A | 11/1995 | Bonebright et al. |
| 5,485,897 A | 1/1996 | Matsumoto et al. |
| 5,491,484 A | 2/1996 | Schuermann |
| 5,491,715 A | 2/1996 | Flaxl |
| 5,512,910 A | 4/1996 | Murakami et al. |
| 5,528,222 A | 6/1996 | Moskowitz et al. |
| 5,537,105 A | 7/1996 | Marsh et al. |
| 5,539,775 A | 7/1996 | Tuttle et al. |
| 5,551,532 A | 9/1996 | Kupersmith |
| 5,555,286 A | 9/1996 | Tendler |
| 5,557,254 A | 9/1996 | Johnson et al. |
| 5,561,435 A | 10/1996 | Nalbandian et al. |
| 5,572,226 A | 11/1996 | Tuttle |
| 5,574,443 A | 11/1996 | Hsieh |
| 5,581,630 A | 12/1996 | Bonneau, Jr. |
| 5,584,070 A | 12/1996 | Harris et al. |
| 5,591,956 A | 1/1997 | Longacre, Jr. et al. |
| 5,598,534 A | 1/1997 | Haas |
| 5,604,143 A | 2/1997 | Ishida et al. |
| 5,606,154 A | 2/1997 | Doigan et al. |
| 5,606,323 A | 2/1997 | Heinrich et al. |
| 5,613,783 A | 3/1997 | Kinney et al. |
| 5,621,412 A | 4/1997 | Sharpe et al. |
| 5,629,981 A | 5/1997 | Nerlikar |
| 5,638,425 A | 6/1997 | Meador, III et al. |
| 5,648,768 A | 7/1997 | Bouve |
| 5,649,296 A | 7/1997 | MacLellan et al. |
| 5,682,139 A | 10/1997 | Pradeep et al. |
| 5,682,143 A | 10/1997 | Brady et al. |
| 5,682,525 A | 10/1997 | Bouve et al. |
| 5,689,094 A | 11/1997 | Friedli et al. |
| 5,701,121 A | 12/1997 | Murdoch |
| 5,710,884 A | 1/1998 | Dedrick |
| 5,712,623 A | 1/1998 | Kumai et al. |
| 5,712,625 A | 1/1998 | Murphy |
| 5,726,630 A | 3/1998 | Marsh et al. |
| 5,739,512 A | 4/1998 | Tognazzini |
| 5,742,509 A | 4/1998 | Goldberg et al. |
| 5,745,036 A | 4/1998 | Clare |
| 5,749,443 A | 5/1998 | Romao |
| 5,758,072 A | 5/1998 | Filepp et al. |
| 5,758,088 A | 5/1998 | Bezaire et al. |
| 5,761,662 A | 6/1998 | Dasan |
| 5,769,051 A | 6/1998 | Bayron et al. |
| 5,773,806 A | 6/1998 | Longacre, Jr. |
| 5,774,859 A | 6/1998 | Houser et al. |
| 5,790,946 A | 8/1998 | Rotzoll |
| 5,809,471 A | 9/1998 | Brodsky |
| 5,818,021 A | 10/1998 | Szewczykowski |
| 5,819,227 A | 10/1998 | Obuchi |
| 5,819,284 A | 10/1998 | Farber et al. |
| 5,842,145 A | 11/1998 | Zimmer |

(56) References Cited

U.S. PATENT DOCUMENTS

| | | |
|---|---|---|
| 5,844,181 A | 12/1998 | Amo et al. |
| 5,850,187 A | 12/1998 | Carrender et al. |
| 5,852,421 A | 12/1998 | Maldonado |
| 5,852,775 A | 12/1998 | Hidary |
| 5,859,628 A | 1/1999 | Ross et al. |
| 5,887,139 A | 3/1999 | Madison, Jr. et al. |
| 5,892,441 A | 4/1999 | Woolley et al. |
| 5,894,266 A | 4/1999 | Wood, Jr. et al. |
| 5,900,808 A | 5/1999 | Lebo |
| 5,901,211 A | 5/1999 | Dean et al. |
| 5,903,317 A | 5/1999 | Sharir et al. |
| 5,907,286 A | 5/1999 | Kuma |
| 5,908,469 A | 6/1999 | Botz et al. |
| 5,915,239 A | 6/1999 | Haavisto et al. |
| 5,917,405 A | 6/1999 | Joao |
| 5,917,433 A | 6/1999 | Keillor et al. |
| 5,918,222 A | 6/1999 | Fukui et al. |
| 5,923,298 A | 7/1999 | Miyahara et al. |
| 5,926,624 A | 7/1999 | Katz et al. |
| 5,932,853 A | 8/1999 | Friedli et al. |
| 5,943,624 A | 8/1999 | Fox et al. |
| 5,948,040 A | 9/1999 | DeLorme et al. |
| 5,955,710 A | 9/1999 | DiFranza |
| 5,959,357 A | 9/1999 | Korman |
| 5,960,074 A | 9/1999 | Clark |
| 5,979,757 A | 11/1999 | Tracy et al. |
| 5,983,073 A | 11/1999 | Ditzik |
| 5,983,161 A | 11/1999 | Lemelson et al. |
| 5,984,051 A | 11/1999 | Morgan et al. |
| 5,995,898 A | 11/1999 | Tuttle |
| 6,002,326 A | 12/1999 | Turner |
| 6,003,135 A | 12/1999 | Bialick et al. |
| 6,009,403 A | 12/1999 | Sato |
| 6,010,074 A | 1/2000 | Kelly et al. |
| 6,011,839 A | 1/2000 | Friedli et al. |
| 6,016,476 A | 1/2000 | Maes et al. |
| 6,028,564 A | 2/2000 | Duan et al. |
| 6,032,089 A | 2/2000 | Buckley |
| 6,037,907 A | 3/2000 | Ha et al. |
| 6,040,745 A | 3/2000 | Tanaka et al. |
| 6,049,745 A | 4/2000 | Douglas et al. |
| 6,055,478 A | 4/2000 | Heron |
| 6,067,521 A | 5/2000 | Ishii et al. |
| 6,069,648 A | 5/2000 | Suso et al. |
| 6,073,118 A | 6/2000 | Gormish et al. |
| 6,073,727 A | 6/2000 | DiFranza et al. |
| 6,078,928 A | 6/2000 | Schnase et al. |
| 6,082,500 A | 7/2000 | Amo et al. |
| 6,091,417 A | 7/2000 | Lefkowitz |
| 6,091,956 A | 7/2000 | Hollenberg |
| 6,112,174 A | 8/2000 | Wakisaka et al. |
| 6,115,611 A | 9/2000 | Kimoto et al. |
| 6,119,065 A | 9/2000 | Shimada et al. |
| 6,122,580 A | 9/2000 | Autermann |
| 6,130,602 A | 10/2000 | O'Toole et al. |
| 6,134,549 A | 10/2000 | Regnier et al. |
| 6,141,611 A | 10/2000 | Mackey et al. |
| 6,144,301 A | 11/2000 | Frieden |
| 6,148,261 A | 11/2000 | Obradovich et al. |
| 6,169,498 B1 | 1/2001 | King et al. |
| 6,173,279 B1 | 1/2001 | Levin et al. |
| 6,177,872 B1 | 1/2001 | Kodukula et al. |
| 6,182,006 B1 | 1/2001 | Meek |
| 6,184,841 B1 | 2/2001 | Shober et al. |
| 6,188,956 B1 | 2/2001 | Walters |
| 6,192,222 B1 | 2/2001 | Greeff et al. |
| 6,201,544 B1 | 3/2001 | Ezaki |
| 6,202,008 B1 | 3/2001 | Beckert et al. |
| 6,202,023 B1 | 3/2001 | Hancock et al. |
| 6,202,799 B1 | 3/2001 | Drop |
| 6,206,142 B1 | 3/2001 | Meacham |
| 6,211,907 B1 | 4/2001 | Scaman et al. |
| 6,223,160 B1 | 4/2001 | Kostka et al. |
| 6,230,082 B1 | 5/2001 | Harada et al. |
| 6,230,132 B1 | 5/2001 | Class et al. |
| 6,230,136 B1 | 5/2001 | Yamamoto et al. |
| 6,233,561 B1 | 5/2001 | Junqua et al. |
| 6,236,836 B1 | 5/2001 | Westman et al. |
| 6,236,968 B1 | 5/2001 | Kanevsky et al. |
| 6,239,765 B1 | 5/2001 | Johnson et al. |
| 6,240,360 B1 | 5/2001 | Phelan |
| 6,240,365 B1 | 5/2001 | Bunn |
| 6,247,645 B1 | 6/2001 | Harris et al. |
| 6,249,740 B1 | 6/2001 | Ito et al. |
| 6,252,544 B1 | 6/2001 | Hoffberg |
| 6,259,891 B1 | 7/2001 | Allen |
| 6,266,614 B1 | 7/2001 | Alumbaugh |
| 6,275,231 B1 | 8/2001 | Obradovich |
| 6,285,317 B1 | 9/2001 | Ong |
| 6,305,604 B1 | 10/2001 | Ono |
| 6,317,027 B1 | 11/2001 | Watkins |
| 6,323,566 B1 | 11/2001 | Meier |
| 6,329,139 B1 | 12/2001 | Nova et al. |
| 6,331,825 B1 | 12/2001 | Ladner et al. |
| 6,332,127 B1 | 12/2001 | Bandera et al. |
| 6,335,685 B1 | 1/2002 | Schrott et al. |
| 6,341,668 B1 | 1/2002 | Fayette et al. |
| 6,349,797 B1 | 2/2002 | Newville et al. |
| 6,362,440 B1 | 3/2002 | Karidis et al. |
| 6,362,737 B1 | 3/2002 | Rodgers et al. |
| 6,397,976 B1 | 6/2002 | Hale et al. |
| 6,401,085 B1 | 6/2002 | Gershman et al. |
| 6,401,112 B1 | 6/2002 | Boyer et al. |
| 6,405,126 B1 | 6/2002 | Palomo et al. |
| 6,411,212 B1 | 6/2002 | Hecht et al. |
| 6,411,874 B2 | 6/2002 | Morgan et al. |
| 6,421,305 B1 | 7/2002 | Gioscia et al. |
| 6,438,561 B1 | 8/2002 | Israni et al. |
| 6,442,530 B1 | 8/2002 | Miller |
| 6,460,036 B1 | 10/2002 | Herz |
| 6,466,232 B1 | 10/2002 | Newell et al. |
| 6,473,790 B1 | 10/2002 | Tagi |
| 6,477,152 B1 | 11/2002 | Hiett |
| 6,477,526 B2 | 11/2002 | Hayashi et al. |
| 6,483,433 B2 | 11/2002 | Moskowitz et al. |
| 6,486,801 B1 | 11/2002 | Jones |
| 6,504,571 B1 | 1/2003 | Narayanaswami et al. |
| 6,507,279 B2 | 1/2003 | Loof |
| 6,522,875 B1 | 2/2003 | Dowling et al. |
| 6,526,335 B1 | 2/2003 | Treyz et al. |
| 6,533,168 B1 | 3/2003 | Ching |
| 6,535,107 B1 | 3/2003 | Bartz |
| 6,557,758 B1 | 5/2003 | Monico |
| 6,564,143 B1 | 5/2003 | Alewine et al. |
| 6,567,122 B1 | 5/2003 | Anderson et al. |
| 6,571,279 B1 | 5/2003 | Herz et al. |
| 6,580,046 B1 | 6/2003 | Koini et al. |
| 6,583,713 B1 | 6/2003 | Bates |
| 6,587,835 B1 | 7/2003 | Treyz et al. |
| 6,590,588 B2 | 7/2003 | Lincke et al. |
| 6,594,580 B1 | 7/2003 | Tada et al. |
| 6,606,644 B1 | 8/2003 | Ford et al. |
| 6,611,691 B1 | 8/2003 | Zhou et al. |
| 6,622,083 B1 | 9/2003 | Knockeart et al. |
| 6,628,336 B2 | 9/2003 | Hamamura |
| 6,636,566 B1 | 10/2003 | Roberts et al. |
| 6,636,748 B2 | 10/2003 | Monroe |
| 6,642,956 B1 | 11/2003 | Safai |
| 6,651,045 B1 | 11/2003 | Macaulay |
| 6,662,083 B2 | 12/2003 | Angel |
| 6,707,421 B1 | 3/2004 | Drury et al. |
| 6,712,276 B1 | 3/2004 | Abali et al. |
| 6,714,249 B2 | 3/2004 | May et al. |
| 6,725,200 B1 | 4/2004 | Rost |
| 6,732,077 B1 | 5/2004 | Gilbert et al. |
| 6,736,322 B2 | 5/2004 | Gobburu et al. |
| 6,754,485 B1 | 6/2004 | Obradovich et al. |
| 6,760,757 B1 | 7/2004 | Lundberg et al. |
| 6,771,981 B1 | 8/2004 | Zalewski et al. |
| 6,774,762 B2 | 8/2004 | Bates |
| 6,799,327 B1 | 9/2004 | Reynolds |
| 6,801,792 B1 | 10/2004 | Schuster et al. |
| 6,806,808 B1 | 10/2004 | Watters et al. |
| 6,812,860 B1 | 11/2004 | Schwarzwalder, Jr. |

(56) References Cited

U.S. PATENT DOCUMENTS

| | | |
|---|---|---|
| 6,823,459 B1 | 11/2004 | Horikoshi et al. |
| 6,836,377 B1 | 12/2004 | Kislev et al. |
| 6,845,084 B2 | 1/2005 | Rangnekar et al. |
| 6,847,490 B1 | 1/2005 | Nordstrom et al. |
| 6,866,195 B2 | 3/2005 | Knowles et al. |
| 6,884,213 B2 | 4/2005 | Raz et al. |
| 6,904,308 B2 | 6/2005 | Frisch et al. |
| 6,934,093 B2 | 8/2005 | Kislev et al. |
| 6,944,533 B2 | 9/2005 | Kozak et al. |
| 6,950,690 B1 | 9/2005 | Meron et al. |
| 6,956,470 B1 | 10/2005 | Heise et al. |
| 6,965,863 B1 | 11/2005 | Zuberec et al. |
| 6,970,088 B2 | 11/2005 | Kovach |
| 6,975,941 B1 | 12/2005 | Lau et al. |
| 6,990,312 B1 | 1/2006 | Gioscia et al. |
| 6,994,250 B2 | 2/2006 | Al Amri |
| 6,994,253 B2 | 2/2006 | Miller et al. |
| 7,005,961 B2 | 2/2006 | Bates |
| 7,017,822 B2 | 3/2006 | Aisenbrey |
| 7,058,397 B2 | 6/2006 | Ritter |
| 7,065,492 B2 | 6/2006 | Cinquini et al. |
| 7,117,369 B1 | 10/2006 | Burns et al. |
| 7,132,946 B2 | 11/2006 | Waldner et al. |
| 7,136,853 B1 | 11/2006 | Kohda et al. |
| 7,253,715 B2 | 8/2007 | Bates |
| 7,257,426 B1 | 8/2007 | Witkowski et al. |
| 7,257,549 B2 | 8/2007 | Karaoguz et al. |
| 7,305,345 B2 | 12/2007 | Bares et al. |
| 7,327,257 B2 | 2/2008 | Posamentier |
| 7,354,397 B2 | 4/2008 | Fujita et al. |
| 7,397,358 B2 | 7/2008 | Boothroyd |
| 7,515,953 B2 | 4/2009 | Madar et al. |
| 7,577,244 B2 | 8/2009 | Taschereau |
| 7,621,458 B2 | 11/2009 | Zellner et al. |
| 7,702,798 B2 | 4/2010 | Apreutesei et al. |
| 7,711,565 B1 | 5/2010 | Gazdzinski |
| 7,765,588 B2 | 7/2010 | Sahota et al. |
| 7,769,656 B1 | 8/2010 | Andrews et al. |
| 7,777,608 B2 | 8/2010 | Bates |
| 7,783,978 B1 | 8/2010 | Andrews et al. |
| 8,205,788 B1 | 6/2012 | Gazdzinski et al. |
| 8,275,617 B1 | 9/2012 | Morgan et al. |
| 8,285,553 B2 | 10/2012 | Gazdzinski |
| 8,812,368 B1 | 8/2014 | Gazdzinski |
| 2001/0017649 A1 | 8/2001 | Yaron |
| 2001/0025341 A1 | 9/2001 | Marshall |
| 2002/0002467 A1 | 1/2002 | Ho |
| 2002/0032435 A1 | 3/2002 | Levin |
| 2002/0046084 A1 | 4/2002 | Steele et al. |
| 2002/0109774 A1 | 8/2002 | Meron et al. |
| 2002/0163443 A1 | 11/2002 | Stewart et al. |
| 2003/0016293 A1 | 1/2003 | Hamamura |
| 2003/0023523 A1 | 1/2003 | McKibben et al. |
| 2003/0050854 A1 | 3/2003 | Showghi et al. |
| 2003/0058345 A1 | 3/2003 | Morris et al. |
| 2003/0058354 A1 | 3/2003 | Parulski et al. |
| 2003/0065805 A1 | 4/2003 | Barnes et al. |
| 2003/0095193 A1 | 5/2003 | May et al. |
| 2003/0114206 A1 | 6/2003 | Timothy et al. |
| 2003/0125963 A1 | 7/2003 | Haken |
| 2003/0189094 A1 | 10/2003 | Trabitz |
| 2003/0195833 A1 | 10/2003 | Baranowski |
| 2004/0010430 A1 | 1/2004 | Cinquini et al. |
| 2004/0030402 A1 | 2/2004 | Pond et al. |
| 2004/0069852 A1 | 4/2004 | Seppinen et al. |
| 2004/0092825 A1 | 5/2004 | Madar et al. |
| 2004/0104842 A1 | 6/2004 | Drury et al. |
| 2004/0124982 A1 | 7/2004 | Kovach |
| 2004/0172262 A1 | 9/2004 | Gonzales et al. |
| 2004/0178912 A1 | 9/2004 | Smith et al. |
| 2004/0239481 A1 | 12/2004 | Beenau et al. |
| 2004/0243518 A1 | 12/2004 | Clifton et al. |
| 2005/0024198 A1 | 2/2005 | Ward |
| 2005/0239402 A1 | 10/2005 | Gioscia et al. |
| 2005/0278991 A1 | 12/2005 | Araujo |
| 2006/0069749 A1 | 3/2006 | Herz et al. |
| 2006/0202827 A1 | 9/2006 | Volpi et al. |
| 2006/0220868 A1 | 10/2006 | Takasawa et al. |
| 2007/0255838 A1 | 11/2007 | Hassan et al. |
| 2007/0273473 A1 | 11/2007 | Bates |
| 2007/0285207 A1 | 12/2007 | Bates |
| 2007/0285208 A1 | 12/2007 | Bates |
| 2007/0285213 A1 | 12/2007 | Bates |
| 2007/0290807 A1 | 12/2007 | Smith et al. |
| 2008/0201748 A1 | 8/2008 | Hasek et al. |
| 2009/0077100 A1 | 3/2009 | Hancock et al. |
| 2009/0278688 A1 | 11/2009 | Tuttle |
| 2009/0289771 A1 | 11/2009 | Tuttle |
| 2010/0023392 A1 | 1/2010 | Merriman et al. |

FOREIGN PATENT DOCUMENTS

| | | |
|---|---|---|
| EP | 0829704 A2 | 3/1998 |
| EP | 0737953 B1 | 2/2000 |
| JP | S5218653 A | 2/1977 |
| JP | S5218653 U | 2/1977 |
| JP | S5239237 A | 3/1977 |
| JP | S59194261 A | 11/1984 |
| JP | H01226681 A | 9/1989 |
| JP | H01242374 A | 9/1989 |
| JP | H0282889 A | 3/1990 |
| JP | H02255487 A | 10/1990 |
| JP | H03272977 A | 12/1991 |
| JP | H04292085 A | 10/1992 |
| JP | H0517083 A | 1/1993 |
| JP | H0558564 A | 3/1993 |
| JP | H05193842 A | 8/1993 |
| JP | H05201624 A | 8/1993 |
| JP | H061549 A | 1/1994 |
| JP | H07295784 A | 11/1995 |
| JP | H0861996 A | 3/1996 |
| JP | H08223309 A | 8/1996 |
| JP | H0970021 A | 3/1997 |
| JP | H1049604 A | 2/1998 |
| JP | H091176 A | 4/1998 |
| JP | H10133847 A | 5/1998 |
| JP | H10164249 A | 6/1998 |
| JP | H10316318 A | 12/1998 |
| JP | H1111807 A | 1/1999 |
| JP | H1117994 A | 1/1999 |
| JP | H11118979 A | 4/1999 |
| JP | 2000191245 A | 7/2000 |
| JP | 2000289943 A | 10/2000 |
| JP | 2000289947 A | 10/2000 |
| WO | WO-9856589 A1 | 12/1998 |
| WO | WO-0058752 A1 | 10/2000 |
| WO | WO03006468 | 10/2003 |

OTHER PUBLICATIONS

Acura Navigation System, Owners Manual for 1996 Acura RL.

Altnether, J., "In-Car Computing and Communication Enables Entertainment, Productivity and Information," Conference on ATT/ITS, 1997.

Andrew Jagoe, Mobile Location Services, The Definitive Guide, Copyright Registration No. TX 5-732-823.

Andrew Jagoe, Mobile Location Services, The Definitive Guide, Library of Congress Date Stamp.

Andrew Jagoe, Mobile Location Services, The Definitive Guide, Pearson Education Inc.

Angermüller et al., Driver Information and Traffic Telematics—The Comprehensive Concept by the Mannesmann Group, SAE Technical Paper Series 960530, International Congress & Exposition (1996).

Arditi, Interactive Tactile Maps, Visual Disability and Accessibility of Building Interiors, Visual Impairment Research, Jan. 1999.

Barnes, The Mobile Commerce Value Chain:Analysis and Future Developments, International Journal of Information Management, vol. 22, No. 2, pp. 91-108 (Apr. 2002).

Bourbakis, An Efficient Vehicles Navigation Methodology Using Dynamic Change in Local Maps, IEEE, Sep. 1995.

(56) References Cited

OTHER PUBLICATIONS

Brewster, Performance Evaluation of the Transmission of Image Data over Digital Networks Involving Mobile Terminals, IEEE, Apr. 1989.
Bryan, Man-Portable Networked Sensor System, Space and Naval Warfare Systems Center, Apr. 1998.
Buchholz, Trends in Electronics (Convergence '98), Automotive Engineering International, Dec. 1998.
Buckley, The Car as a Peripheral, Adapting a Portable Computer to a Vehicle Intranet, SAE International 98C030, Oct. 19, 1998.
Chan, Next-Generation Wireless Data Services: Architecture and Experience, IEEE Personal Communications, Feb. 1999.
Clarion AutoPC brochure, published in 1998 by Clarion Sales Corporation.
Clarion AutoPC Quick Reference Guide, published in 1998 by Clarion Co. Ltd.
Clarion AutoPC310C Owner's Manual, published in 1998 by Clarion Co. Ltd.
Complaint for Patent Infringement, *West View Research LLC* v. *Volkswagen Group of America, Inc.*, 3:16-cv-02643-LAB-NLS, D.I. 1 (S.D. Cal. Oct. 24, 2016).
Crawford, Multimedia on the Move, Alpine Electronics Annual Review, 1998.
Crow, Wireless Local Area Networks, IEEE, Sep. 1997.
Customized Touch-Screen Kiosks and Services, DynaTouch, Dec. 1999.
Daimler-Benz Research and Technology previews first "Internet on Wheels" Technology; Future Mercedes-Benz drivers and passengers to access Cyberspace, Business Wire, Apr. 30, 1997.
Defendants' Invalidity Contentions. served Aug. 28, 2015.
Delorme's New AAA Map'n'Go 4.0 Takes Family Fun on the Road, (GARM-PRIART-009006-009008).
Delphi Teams with Saab to Exhibit Mobile Media Featuring Microsoft Windows CE-Based Auto PC, Feb. 1998.
Dias, Traveler's On-Line Information System—TOI: Information System and Location Modules, Third Joint European Conference & Exhibition on Geographical Information, 1997.
Festa, Clarion to build AutoPC using MS software, CNET News, (Jan. 8, 1998).
Flynn, David, IBM's Corporate High Flier, The Sydney Morning Herald, Sep. 29, 1997.
Freeman, Springfield's New Take on City Hall, Public Management, Jun. 1996.
Gargiulo, Developing a Functional Wayfinding System from the Existing Signage System at Madigan Army Medical Center, May 1994.
Glathe, The Prometheus Programme—Objectives, Concepts and Technology for Future Road Traffic, ATA, May 1990.
GM: "Network Vehicle," Normans Media, Feb. 1998.
Grize, Cybcerone, Interaction, Nov./Dec. 1997.
Gross, Buildings, Memory and Wayfinding, EDRA 21, 1990.
Haartsen J., "Bluetooth—The Universal Radio Interface for Ad Hoc," Wireless Connectivity, Ericson Review No. 3, 1998, pp. 110-117.
Hemphill et al., Voice-Driven Information Access in the Automobile, SAE Paper 98C032, published Oct. 19, 1998.
Hertel, A Voice-Activated Co-Pilot: ICES, Smart Computing, vol. 8, issue 1, Jan. 2000.
Hickman, The Internet on Wheels (PC Magazine Jul. 1997).
Honda, Information Services for Greater Driving Enjoyment, SAE International, Feb. 1998.
Huang Z., et al., "A New Location Coding Scheme for Intelligent Transportation System," ITS Journal, 1996, vol. 3 (2), pp. 99-109.
IEEE 802.11 standard, 1997, www.ieeexplore.ieee.org/document/654779.
Inoue, Digital Mobile Communication System Designed for Nationwide Police Activities—WIDE System, IEEE, 1996.
Intel Drives Connected Car PC Technology to Las Vegas Consumer Electronics Show, Intel News Release, Jan. 6, 1998.
Interactive Electronics, Popular Science, Jun. 1996.

Jacobs, Karen (Dec. 7, 1999) "Elevator Maker to Add Commercial Touch," The Wall Street Journal, pp. 1-2.
Jameel A., et al., "Internet Multimedia on Wheels: Connecting Cars to Cyberspace," IEEE, Jan. 1998.
Jameel A., et al., "Web on Wheels: Toward Internet Enabled Cars," IEEE, Jan. 1998.
Jost, "The Car as a Mobile-Media Platform," Automotive Engineering International, May 1998.
Julia, Cooperative Agents and Recognition Systems (CARS) for Drivers and Passengers, IEEE, Nov./Dec. 1998.
Jurgen (ed.), Automotive Electronics Handbook, Chapter 11.
Kahaner, (Mar. 16, 1991) "Hitachi 1991 Technology Exhibition, Tokyo," Asian Technology Information Program, pp. 1-14.
Kahn, Real Space and Cyberspace, A Comparison of Museum Maps and Electronic Publication Maps, Museums and Interactive Multimedia, 1997.
Kamai, MONET—Compatible Car-Mounted Information Terminal, Fujitsu Ten Tech. J., Jun. 1998.
Kay, STRIPE: Remote Driving Using Limited Image Data, Carnegie Mellon University, 1997.
Kempainen, In-car Computing gets Personal, UBM LLC, Aug. 1998.
Kirschner, Wired Wheels, Popular Science, Mar. 1998.
Kirson, The Evolution of Advance Development and Operational Test of a Probe-Based Driver Information System in an Arterial Street Network, IEEE, 1992.
Komanecky, IVHS Applications of Smart Cards, 1991.
Kraak, Integrating Multimedia in Geographical Information Systems, IEEE, 1996.
Krebs, "Cars That Tell You Where to Go," The New York Times, Dec. 15, 1996.
Kreft W., "Information and Communication Systems at Volkswagen," presentation from Automobile Electronics Conference, Nov. 1993.
Krulwich, Multimedia Consumer Applications on the Information Superhighway, IEEE, 1994.
LaPierre, Personal Navigation System for the Visually Impaired, Carleton University, 1998.
Library of Congress Public Catalog Information, 17th DASC: The AIAA/IEEE/SAE Digital Avionics Systems Conference: Proceedings: [Electronics in motion]: Bellevue, WA, Oct. 31-Nov. 7, 1998.
Lind, abstract of "The Network Vehicle—A Glimpse into the Future of Mobile Multimedia," SAE Paper No. 982901, http://papers.sae.org/982901/.
Lind, et al., The Network Vehicle—A Glimpse into the Future of Mobile Multi-Media, The 17th DASC—The AIAA/IEEE/SAE Digital Avionics Systems Conference—Bellevue, WA.
Lind R., et al., "The Network Vehicle—A Glimpse into the Future of Mobile Multi-Media," IEEE Aerospace and Electronic Systems Magazine,vol. 14, No. 9, pp. 27-32, 1999.
Lind R., et al., "The Network Vehicle—A Glimpse into the Future of Mobile Multi-Media," IEEE, Mar. 1998.
Lind R., et al., "The Network Vehicle—A Glimpse into the Future of Mobile Multi-Media," SAE Technical Paper Series, 982901, IEEE, Nov. 1998.
Map'n'Go, AAA, Introductory Guide, 1998.
Map'n'Go, AAA, User Manual, 1998.
"MapQuest Launches Revolutionary GeoCentric Advertising Program Enabling Businesses to Provide Geographically Sensitive Advertisements as Users Click on Destinations and Content". Nov. 4, 1996. PR Newswire.
MARC Tags corresponding to Library of Congress Public Catalog Information, 17th DASC: The AIAA/IEEE/SAE Digital Avionics Systems Conference: Proceedings: [Electronics in motion].
Markoff, Daimler-Benz to Exhibit an Early-Stage Internet Car, N.Y. Times, Apr. 29, 1997.
Martin, Intel's Powerful PC Cuts Pizzazz in New Vehicles, Automotive Industry News, Feb. 1998.
Meggers, A Multimedia Communication Architecture for Handheld Devices, IEEE, Sep. 1998.
Meleis, The Future of Information Networks and Distributed Applications, IEEE, Apr. 1995.

(56) References Cited

OTHER PUBLICATIONS

Meng, Wheels: A Conversational System in the Automobile Classifieds Domain, IEEE, Oct. 1996.
Microsoft Comes to the Market, Its International, Jan./Feb. 1998.
Minagawa, Open Architectural Car Multimedia Platform, 1998.
Mitchener, Focus on CeBIT: Cars May Turn to Information Superhighway—Computer Firms Envision Smart Vehicles Down the Road, Dow Jones & Company Inc., Mar. 1998.
Muthusamy Y., et al., "Speech-Enabled Information Retrieval in the Automobile Environment," IEEE, Mar. 1999.
Navigation Takes Direction, Twice Mobile Electronics, Jan. 1999.
Noguchi, Intelligent Car—History and the Future in Japan and Toyota, 1998.
Odyssey Installation and Start-Up Guide, published in 1999 by InfoGation Corp.
Odyssey Navigation Software for the Clarion AutoPC User Manual, published by InfoGation Corp., May 1999.
Odyssey Quick Reference Guide, published in 1999 by InfoGation Corp.
Oki, N., et al., "Portable Vehicle Navigation System (NV-1 ): Its Features and Operability," IEEE, 1993, pp. 482-485.
Perdue, Lewis (Jul. 20, 1999) "Forget Elevator Music Here Comes Elevator Internet," Internet VC Watch, pp. 1-2.
Perkins, Mobile-IP, Ad-Hoc Networking, and Nomadicity, IEEE, Aug. 1996.
Peters D., et al., Car Multimedia—Mobile Multimedia for the 21st Century, VDI Society for Vehicle and Traffic Technology, VDI Reports 1547, Electronic Systems for Vehicles, Meeting at Baden-B.
Petition for Inter Partes Review of U.S. Pat. No. 8,065,156, Case No. IPR2015-01941, 68 pages, served Oct. 9, 2015.
Petition for Inter Partes Review of U.S. Pat. No. 8290778, Case No. IPR2016-00125, 66 pages, served Nov. 17, 2015.
Petition for Inter Partes Review of U.S. Pat. No. 8296146, Case No. IPR2016-00156, 64 pages, served Nov. 17, 2015.
Petition for Inter Partes Review of U.S. Pat. No. 8682673, Case No. IPR2016-00137, 65 pages, served Nov. 17, 2015.
Petition for Inter Partes Review of U.S. Pat. No. 8706504, Case No. IPR2016-00124, 59 pages, served Nov. 17, 2015.
Petition for Inter Partes Review of U.S. Pat. No. 8719037, Case No. IPR2016-00123, 65 pages, served Nov. 17, 2015.
Petition for Inter Partes Review of U.S. Pat. No. 8719038, Case No. IPR2016-00146, 66 pages, served Nov. 17, 2015.
Petition for Inter Partes Review of U.S. Pat. No. 8781839, Case No. IPR2016-00177, 65 pages, served Nov. 17, 2015.
Popescu-Zeletin, Applying Location-Aware Computing for Electronic Commerce: Mobile Guide, Fifth Conference on Computer Communication, AFRICOMCCDC '98, Oct. 1998.
PR News, Automotive Immobilizer Anti-Theft Systems Experience Rapid Growth in 1999.
Presse-Information Hannover Messe '96, Infotainment Car.
PulsON (May 2000), "Time Modulated Ultra-Wideband for Wireless Applications", 2000Time-Domain Corporation, Time Domain. Rev. 2, (13 pgs.).
Restivo, Mobile Drivers Feast on Devices Buffet, Computer Dealer News, Jan. 1999.
Rillings, Travtek, IVHS America, May 1992.
Rillings, TravTek, SAE, 1991.
Ross, Buick XP 2000—Trends, Motor Trend, Jan. 1995.
Sante, "1996 Lincoln Continental, The traditional American luxury car is big, boxy, supremely comfortable . . . ".
Schmitz, A New State-of-the-Art Keyless Entry System, SAE International, Feb. 1998.
Segarra, Escort Memories: A Key Technology Supporting the Automobile Life Cycle Processes, 1996.
Shields, U.S. Trends in Navigable Digital Map Databases, IEEE 1994.
Stein, Access: A Computer-Simulated In-Vehicle A TIS Prototype Employing Synthetic Speech and Recognition, ITS America, Mar. 1995.
Stevens Institute of Technology, Spring 1999 Final Report, pp. 1-12.
Strauss H.J., "HyperMaps: Telling Your Users Where to Go," New Centerings in Computing Services, ACM SIGUCCS XVIII, 1990, pp. 377-389.
StreetPilot Owner's Manual, Garmin Corporation.
Stumpf, Delivery and Test of the Digital Hardhat System at U.S. Army Corps of Engineers Fort Worth District Office, US Army Corps of Engineers, Dec. 1998.
Sugimoto, Development of Toyota In-Vehicle Equipment for the VICS Demonstration Test, IEEE, 1994.
Sweeney, An Overview of Intelligent Vehicle Highway Systems (IVHS), IEEE, Sep. 1993.
Takahashi, Next, Let's Try Asking the Car, How Do Ya Get to Carnegie Hall?, Wall Street Journal, Feb. 1997.
Tanaka, Onboard System Devices fora Vehicle Information and Communication System, Fujitsu Ten Tech. J., 1995.
The Network Vehicle Presentation, Delphi, Sun Microsystems, IBM, Netscape, Delco. Computer Dealers Exhibit Show, Las Vegas Nov. 1997.
The New Universe!, Volkswagen Magazine, Dec. 1999, German and English versions.
The What's New Magazine, Popular Science, VWGoA—Exhibit 1010, 1998, vol. 252 (3), pp. 5-7 & 54-55.
Thoone, CARIN, A Car Information and Navigation System, Philips Technical Review, Dec. 1987.
U.S. Copyright Office Public Catalog Information, "Quarterly technical papers on microfiche," ISSN 0148-7191.
U.S. Copyright Registration No. TX4-900-822, "1998 IEEE/AIM 17th Digital Avionics Systems Conference—Oct. 31, 1998—Bellevue, WA—(98CH36267)," dated—Dec. 8, 1998.
U.S. Copyright Registration No. TX5-149-812, "Nov. 1998 Quarterly Technical Papers on Microfiche (MICQ-N98)," dated Jun. 2, 2000.
VDO Kienzle Fleet Manager 200 Product Manual, Nov. 1998.
Virrantaus et al., Developing GIS-Supported Location-Based Services, Proceedings of the Second International Conference on Web Information Systems Engineering (2002).
Visteon's Mobile Office Solutions Give Busy Commuters More of What They Need—Time, Canada NewsWire, Financial News, Sep. 15, 1999.
Volkswagen Group of America, Inc. Petition for Inter Partes Review of U.S. Pat. No. 9299053 Pursuant to 35 USC §312 and 37 CFR §42.104, Case No. IPR2017-01156, 73 Pages.
Volkswagen Group of America, Inc. Petition for Inter Partes Review of U.S. Pat. No. 9412367 Pursuant to 35 USC §312 and 37 CFR §42.104, Case No. IPR2017-01155, 80 Pages.
Vollmer, "Nutzungsgerechte Mobilkommunikation," User-Friendly Communication, Proceedings of the Congress Held in Munich, Mar. 12-13, 1990.
VW is working on a Multimedia Car, Reuters AG, in German and English, Apr. 22, 1996.
*West View Research LLC v. BMW of North America, LLC, et al.*; 3:16-cv-02590 (S.D. Cal.).
Yankelovich, How do Users Know What to Say?, Interactions, Nov./Dec. 1996.
Yoneda, et al. (Dec. 1997) "Multi-Objective Elevator Supervisory-Control System with Individual Floor-Situation Control," Hitachi Review, p. 1.
Zhao, Efficient and Reliable Data Transmission for Cellular-and-GPS Based Mayday Systems, IEEE, Nov. 1997.
Zue, Toward Systems that Understand Spoken Language, IEEE, Feb. 1994.
Analog Devices' Blackfin Product.
At Road FleetASP Product.
Motorola's mobileGT Tota15200 Product.

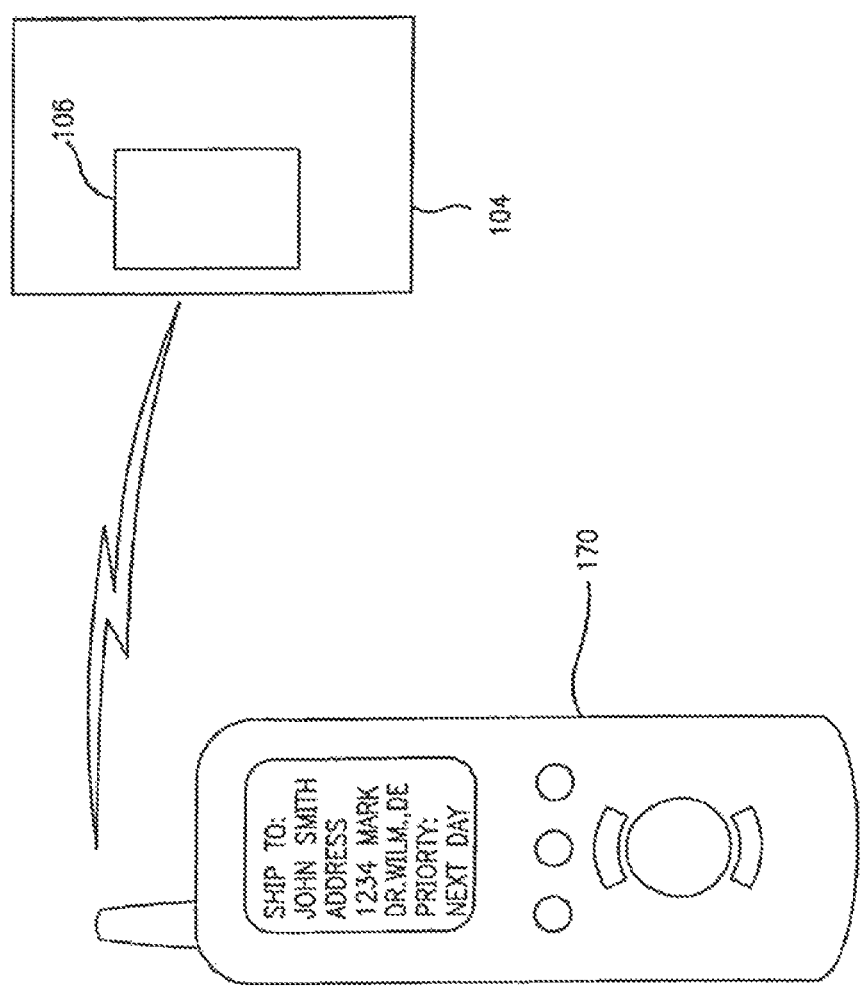

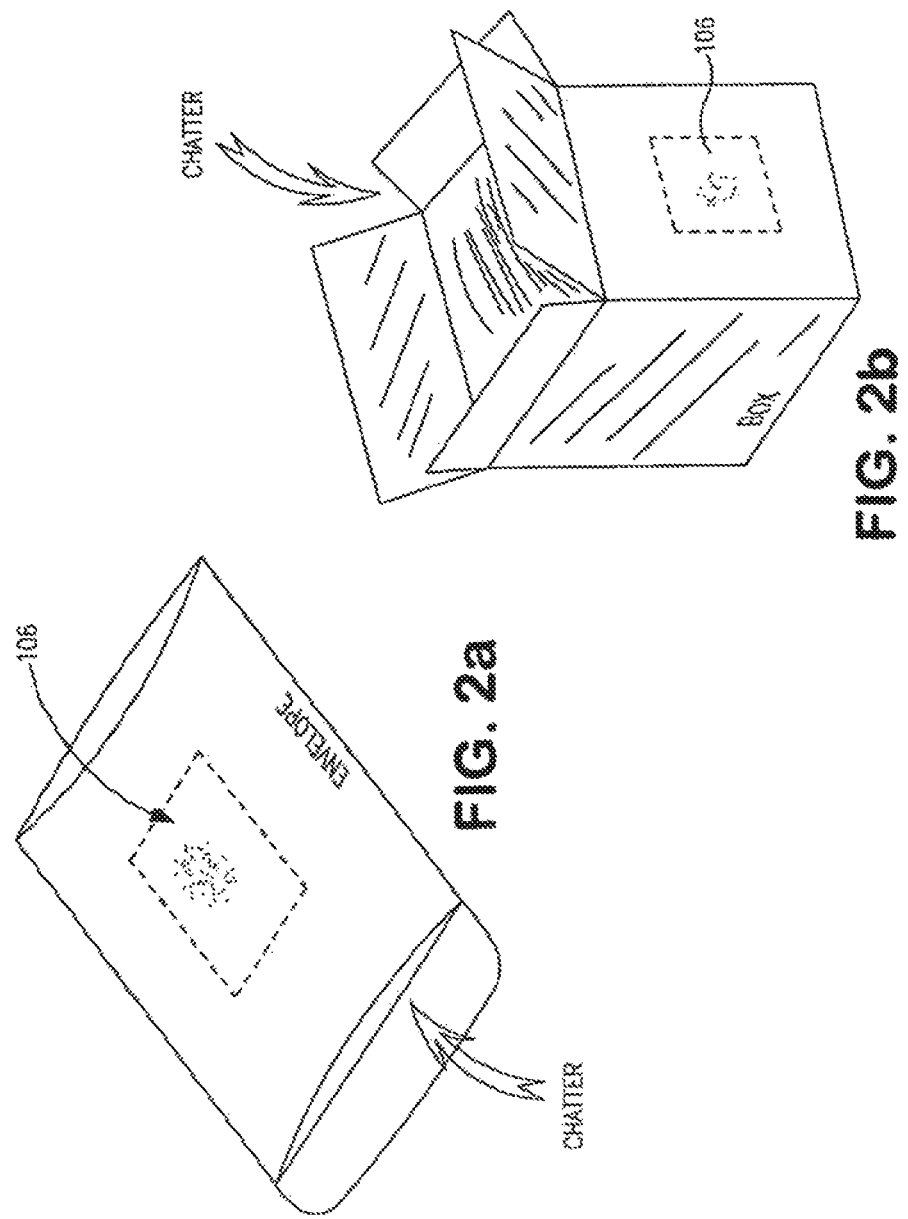

COMPUTERIZED METHODS FOR LOCATION-BASED SERVICE PROVISION

PRIORITY

This application is a divisional of U.S. patent application Ser. No. 14/645,235 filed Mar. 11, 2015 and entitled "METHODS FOR SHIPPING ELEMENT PROCESSING," issuing on Mar. 28, 2017 as U.S. Pat. No. 9,607,280, which is a divisional of and claims priority to co-owned U.S. patent application Ser. No. 13/761,077 filed Feb. 6, 2013 entitled "PORTABLE COMPUTERIZED WIRELESS APPARATUS", now U.S. Pat. No. 9,033,226; which is a continuation of and claims priority to co-owned U.S. patent application Ser. No. 13/604,511 filed Sep. 5, 2012 entitled "PORTABLE COMPUTERIZED WIRELESS INFORMATION APPARATUS AND METHODS", now U.S. Pat. No. 8,413,887; which is a continuation of and claims priority to U.S. patent application Ser. No. 13/421,713 filed Mar. 15, 2012 and entitled "PORTABLE COMPUTERIZED WIRELESS PAYMENT APPARATUS AND METHODS", now U.S. Pat. No. 8,371,503; which is a continuation of and claims priority to co-owned and co-pending U.S. patent application Ser. No. 12/284,492 filed Sep. 22, 2008 entitled "CHATTEL MANAGEMENT APPARATUS AND METHODS", now U.S. Pat. No. 8,205,788; which is a continuation of and claims priority to U.S. patent application Ser. No. 11/015,384 filed Dec. 16, 2004 and entitled "CHATTEL MANAGEMENT APPARATUS AND METHODS", now U.S. Pat. No. 7,427,024; which claims priority to U.S. Provisional Patent Application No. 60/530,812 entitled "POINT-OF-DEPARTURE CHATTEL MANAGEMENT APPARATUS AND METHODS" filed Dec. 17, 2003, each of the foregoing incorporated herein by reference in its entirety.

This application is also related to co-owned U.S. patent application Ser. No. 13/727,306 filed Dec. 26, 2012 and entitled "COMPUTERIZED WIRELESS PAYMENT METHODS", now U.S. Pat. No. 8,613,390; Ser. No. 13/733,102 filed on Jan. 2, 2013 and entitled "COMPUTERIZED INFORMATION AND DISPLAY APPARATUS", now U.S. Pat. No. 8,690,050; Ser. No. 13/733,106 filed Jan. 2, 2013 and entitled "PORTABLE COMPUTERIZED WIRELESS PAYMENT APPARATUS AND METHODS", now U.S. Pat. No. 8,579,189; Ser. No. 13/738,671 filed Jan. 10, 2013 and entitled "PORTABLE COMPUTERIZED WIRELESS PAYMENT APPARATUS AND METHODS", now U.S. Pat. No. 8,622,286; Ser. No. 13/756,984 filed Feb. 1, 2013 and entitled "PORTABLE COMPUTERIZED WIRELESS PAYMENT APPARATUS AND METHODS", now U.S. Pat. No. 8,640,944; Ser. No. 14/606,959 filed Jan. 27, 2015 and entitled "PORTABLE COMPUTERIZED WIRELESS APPARATUS", now U.S. Pat. No. 9,299,053; Ser. No. 14/610,946 filed Jan. 30, 2015 and entitled "METHODS OF TRANSPORT OF ONE OR MORE ITEMS BETWEEN LOCATIONS", now U.S. Pat. No. 9,424,547, Ser. No. 14/642,594 filed Mar. 9, 2015 and entitled "COMPUTERIZED APPARATUS AND METHODS FOR TRANSFER BETWEEN LOCATIONS", now U.S. Pat. No. 9,396,450, and 14/616,559 filed February 6, 2015 and entitled "COMPUTERIZED APPARATUS FOR TRANSFER BETWEEN LOCATIONS", now U.S. Pat. No. 9,349,112, each also incorporated herein by reference in its entirety.

1. FIELD OF THE INVENTION

The present invention relates to improved methods and apparatus for the management, tracking and recovery of chattel at e.g., transportation facilities such as airports.

2. DESCRIPTION OF RELATED TECHNOLOGY

With the heightened level of security at airports and other facilities where large numbers of people gather, many passengers have personal or other items ("chattel"), such as pocket knives, tools, large belt buckles, wireless devices, personal security devices, etc., that are subject to confiscation by security personnel at the security checkpoint before proceeding further. Hence, the passengers or patrons are given the choice of either surrendering the items to the security personnel, or attempting to find some other mechanism for their safekeeping. Accordingly, airports and the like collect literally tons of such personal items each year since many people choose simply to surrender their items rather than having their progress impeded.

A number of different approaches to chattel (and baggage) tracking and management are present under the prior art. For example, United States Patent Publication No 20020163443 to Stewart, et al. published Nov. 7, 2002 entitled "Airport valet communication system" discloses an improved airport valet communication system. The system attaches a vehicle tag to a vehicle. A stall tag is also provided and is placed somewhere within the vicinity of a parking stall. To communicate with these two tags, a handheld computer is provided by the system for communicating with the vehicle tag via radio frequency communication to obtain an identification of the vehicle and for communicating with the stall tag via radio frequency communication to obtain an identification of the parking stall so as to correlate the vehicle and the parking stall in which the vehicle is parked.

United States Patent Publication No. 20030189094 to Trabitz, published Oct. 9, 2003 entitled "Baggage tracking system" discloses a passenger and baggage reconciliation system that employs non-programmable, passive transponder, radio frequency identification (RFID) tags attached to checked baggage, which enables continuity of reconciliation through any number of intra-air transfer points until the destination of the air travel is reached. If separation of the passenger and baggage occurs prior to the planned air travel destination, the system furnishes prompt notification to the airline. While enrollment of the passenger occurs upon payment for travel, checked baggage enrollment can occur variously outside the airport building (curbside), at the ticket counter, at the departure gate, on board the airplane, or along side the airplane prior to mounting the stairway or on the jet bridge. The interface to the airline carrier's computer reservation system (CRS) to obtain passenger and schedule data permits continuous tracking of passengers and baggage for the reconciliation process. The CRS creates a passenger name record (PNR) for each traveler, which contains fields for entering identification codes for checked baggage. Separate PNR fields and codes are used for each item of baggage that is checked. The PNR entry is obtained from reading the embedded identification number on the attached RFID tag when the baggage is checked in.

United States Patent Publication No. 20040010430 to Cinquini, et al. published Jan. 15, 2004 entitled "Method and apparatus for providing a personal item drop off/return service at security checkpoints" discloses an apparatus and method that provide a personal item return service to an owner of a personal item that is subject to confiscation before the owner is admitted through a security checkpoint and into a secure area downstream of the security checkpoint. The security checkpoint can be located at a transportation center (airport, bus or train) or any entrance to a secure area at a building or sports arena. The owner can purchase from a vending machine or kiosk a container having sufficient pre-paid postage based on the size or weight of the item, and mail the item to a destination selected by the owner. The service is located adjacent to the security checkpoint so that the owner need not lose his/her place in the security line.

United States Patent Publication No. 20040124982 to Kovach published Jul. 1, 2004 entitled "Method for tracking and processing passengers and their transported articles" discloses a method for tracking and handling people and articles at an airport using Radio-Frequency Identification ("RFID") tags. The RFID tag contains an electronic microchip with a memory portion, permanently attached to a substrate having a planar antenna. Each RFID tag is tuned to operate at a specific frequency and includes a unique identifier number stored in the memory portion. Passenger-specific information, such as passenger name, address and flight itinerary may be sent to the microchip for storage in the memory portion by means of an RF field provided by an external "scanner" device. The scanner also provides a means for reading data stored in the memory portion of the microchip.

United States Patent Publication No. 20040243518 to Clifton, et al. published Dec. 2, 2004 entitled "Individual identity authentication system" discloses an individual identity authentication system for authenticating an identity of an individual includes a client computer system and a service provider computer system. The client computer system may be implemented at various locations, for example, airport terminals, so as to provide ready access for various users to authenticate the identity of a particular individual. The service provider computer system is in communication with the client computer system and executes code for causing the service provider computer system to perform a number of steps. One step includes receiving a personal identification number (PIN) and a social security number (SSN) of an individual that is entered into a secure terminal associated with the client computer system. Another step includes authenticating an identity of the individual when the entered PIN and the entered SSN correspond to a registered PIN and a registered SSN of the individual.

Despite the foregoing, there is still a salient need for flexible and efficient chattel management techniques and apparatus that provide the user (and in fact the facility operator) with a highly configurable and modular system that can be readily adapted to a number of different paradigms. Such improved techniques and apparatus would also ideally be compatible with existing and incipient personal electronics and networking technologies.

SUMMARY OF THE INVENTION

In a first aspect, a method of operating a data network computerized server apparatus is disclosed. In one embodiment, the method is to at least enable provision of one or more user-specific services to each of a plurality of users, the computerized server apparatus comprises at least one computer program operative to be executed thereon, and one or more data network interfaces configured to communicate data with one or more data networks, and the method includes: utilizing the at least one computer program to receive, via the at least one data network interface, and sent from respective mobile wireless-enabled user devices, respective data enabling identification of respective user-specific accounts accessible by the data network computerized server apparatus; utilizing the at least one computer program to receive, via the at least one network interface, and sent from the respective mobile wireless-enabled user devices, respective data messages comprising location-related data, the respective location-related data (i) obtained by respective ones of mobile wireless-enabled user devices, and (ii) relating to a destination for provision of respective ones of the one or more user-specific services; utilizing the at least one computer program to cause accessing of data within the respective user-specific accounts, the accessed data identifying respective ones of transportation modalities for provision of the respective user-specific services, the accessing data within the respective user-specific accounts based at least in part on the respective data enabling identification of the respective user-specific accounts; utilizing the at least one computer program to generate a plurality of data messages for transmission to the respective ones of the transportation modalities, the data messages each comprising at least a portion of the respective location-related data; and utilizing the at least one computer program to cause transmission of the plurality of data messages to the respective transportation modalities via at least the at least one network interface, the data messages each configured to at least enable provision of the respective user-specific service for the respective user at the respective destination.

In a second aspect, a method of operating a computerized network apparatus to automatically enable provision of one or more services to each of a plurality of users each having respective mobile wireless-enabled user devices is disclosed. In one embodiment, the user devices have application computer programs operative to run thereon, the computerized network apparatus comprises at least one computer program operative to be executed thereon, and one or more network interfaces configured to communicate data with at least one data network, and the method includes: utilizing the at least one computer program to conduct authentication processes with the respective mobile wireless-enabled user devices, the authentication processes each comprising: (i) using the computerized network apparatus to authenticate the application computer program of the respective mobile wireless-enabled user device; and (ii) using the computerized network apparatus to enable authentication of the computerized network apparatus by the application computer program of the respective mobile wireless-enabled user device, the authentication processes each conducted as part of one or more sessions established according to at least one of: (a) a transport layer security (TLS) protocol; and/or (b) a secure sockets layer security (SSL) protocol, at least one of the (i) using the computerized network apparatus to authenticate the application computer program of the respective mobile wireless-enabled user device, and/or (ii) using the computerized network apparatus to enable authentication of the computerized network apparatus by the application computer program, comprising use of a challenge-based approach utilizing at least one RAND (random) data value; utilizing the at least one computer program to receive, via the at least one data network interface, respective data enabling identification of respective user-specific accounts accessible by the computerized network apparatus, the respective data enabling identification of respective user-specific accounts having been transmitted to the computerized network apparatus by the respective application computer programs operative to run on the respective mobile wireless-enabled user devices, the respective transmissions each in response to a user touch-screen input via a soft function key (SFK) input function of the respective application computer program; utilizing the at least one computer program to cause accessing of data within the respective user-specific accounts, the accessed data enabling communication with respective ones of transportation modalities for provision of the respective user-specific services, the accessing data within the respective user-specific accounts based at least in part on the respective data enabling identification of the respective user-specific accounts; utilizing the at least one computer program to receive, via the at least one network interface, respective location-related data, the respective location-related data: (i) obtained by respective ones of the mobile wireless-enabled user devices using the respective application computer program thereof, and (ii) relating to a geographic destination location for the user or at least one chattel thereof; utilizing the at least one computer program to generate a plurality of data messages for transmission to respective ones of the transportation modalities, the data messages each comprising at least a portion of the respective location-related data; and utilizing the at least one computer program to cause transmission of the data messages to the respective ones of the transportation modalities via at least the at least one network interface, the provision of the respective data messages enabling subsequent movement of the respective transportation modalities to the respective destinations.

In another aspect, a method of operating a mobile computerized apparatus of a user having an application computer program operative to run thereon is disclosed. In one embodiment, the mobile apparatus includes a wireless data interface, and the method is configured to automatically enable provision of one or more user-specific services associated with a land vehicle, the one or more user-specific services being provided based at least on a user-specific account maintained at least in part in a secure network storage location, the method including: establishing, via at least the application computer program, a secure data communications session between the mobile computerized apparatus and a network server apparatus, the secure data communications session established based at least on data provided to the network server apparatus by the mobile computerized apparatus and relating to the user-specific account, the network server apparatus configured to access the secure network storage location to access the user-specific account based at least in part on the data provided to the network server apparatus by the mobile computerized apparatus and relating to the user-specific account; receiving at the mobile computerized apparatus, via at least the application computer program and the wireless data interface, data relating to a user-specified geographic location or address, the data relating to the user-specified geographic location or address having been obtained from the user via at least a computerized kiosk apparatus disposed at a point of travel departure for the user; and automatically causing transmission of at least the data relating to the user-specified geographic location or address to the network server apparatus via at least the wireless data interface and the established data communications session.

In one variant, the transmitted data relating to the user-specified geographic location or address enables automatic forwarding by the network server apparatus to an electronic address previously designated within the user-specific account, the automatic forwarding to enable provision of the one or more user-specific services associated with the land vehicle; and the one or more user-specific services associated with the land vehicle comprise movement of the land vehicle to the user-specified geographic location or address.

In another aspect, a method of providing a user-specific service to a user via at least a mobile computerized electronic apparatus such that the user does not need to know an address of a location where the mobile computerized electronic apparatus is presently located, is disclosed. In one embodiment, the user-specific service is provided based at least on a user-specific account maintained at least in part in a secure network storage location, the mobile computerized electronic apparatus comprising at least: a digital processing apparatus comprising at least one integrated circuit (IC); a global positioning system (GPS)-based receiver apparatus configured to generate location-related data; a wireless interface in data communication with the digital processing apparatus; and a storage device comprising at least one IC with at least one computer program stored thereon, the storage device in data communication with the digital processing apparatus; and the method includes: utilizing the at least one computer program to receive location-related data, the location-related data generated by the GPS-based receiver apparatus based on a then-current location of the mobile computerized electronic apparatus; utilizing the at least one computer program to automatically generate at least one electronic message for transmission to a network server apparatus, the at least one electronic message comprising at least a portion of the location-related data based on the then-current location; and utilizing the at least one computer program to automatically cause transmission of the at least one electronic message to the network server apparatus via at least the wireless interface.

BRIEF DESCRIPTION OF THE DRAWINGS

FIG. 1a is an elevational view of an exemplary hand-held interrogator/receiver/display device according to the invention.

FIGS. 2a-2c are perspective views of envelope, box, and tube embodiments, respectively, of the shipping elements of the invention.

DESCRIPTION OF THE INVENTION

Figure 1:
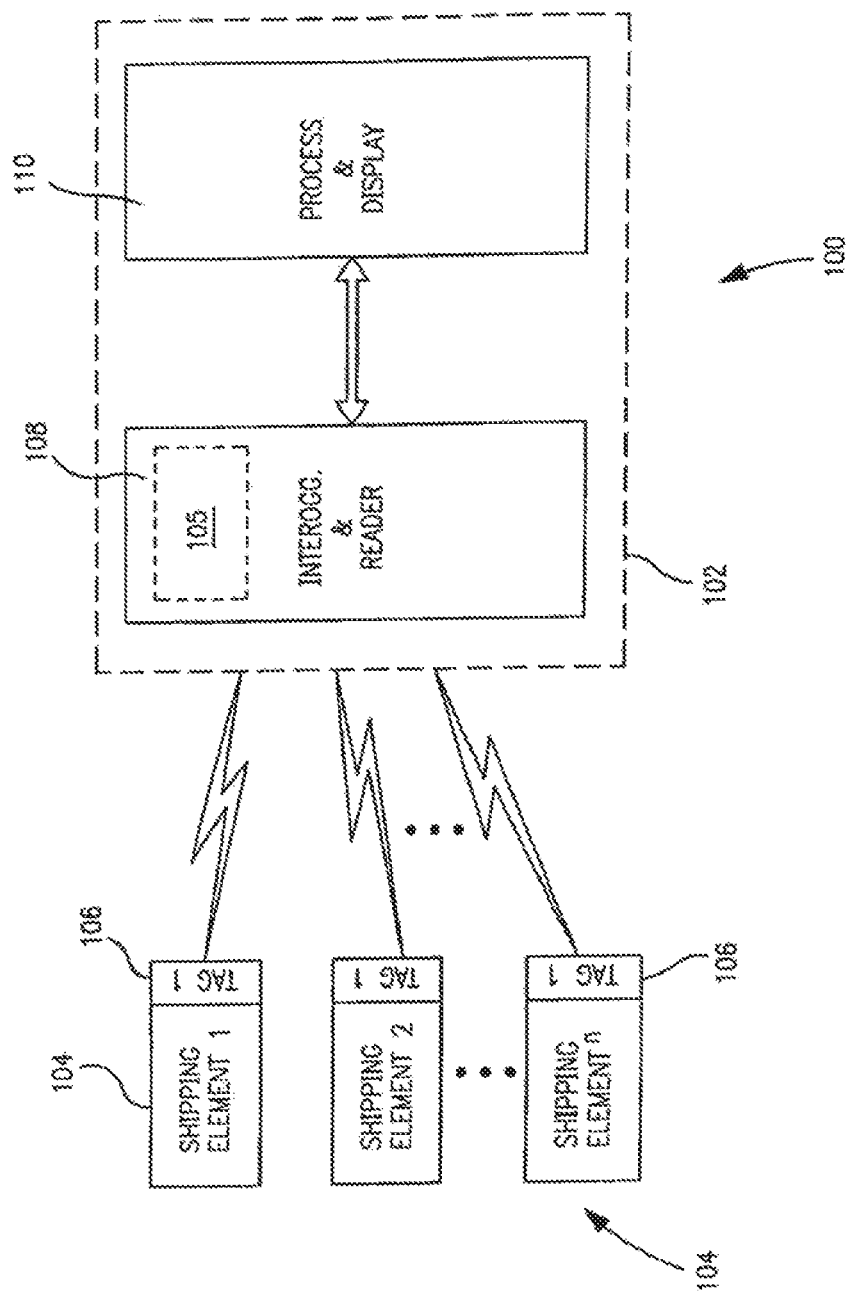
FIG. 1 is a block diagram of one exemplary embodiment of the chattel management system of the invention.

Reference is now made to the drawings listed above, wherein like numerals refer to like parts throughout.

As used herein, the terms "chattel" and "chattels" refers generally to any type of property or possession (regardless of ownership), which may generally be carried on or by a person (including within associated transport devices such as luggage, etc.). Chattel includes, without limitation, car keys, personal security devices (e.g., mace, pepper spray), knives, handguns, ammunition, tools, personal electronic devices, pharmaceuticals, cosmetics, jewelry, belt buckles or other metallized apparel, wrist watches, hats, cellular telephones, USB keys, glasses, magnetic or optical media, electric razors, personal computers, cameras, film, pagers, electronic games, purses, currency, iPods, etc.

As used herein, the term "passenger" shall mean any entity, whether human or otherwise, who utilizes a transportation modality.

As used herein, the term "transportation modality" refers to any form of transportation for either person, animals, and/or inanimate objects including, without limitation, aircraft, ships, ferries, land vehicles (buses, trains, cars, etc.), shuttles, etc.

As used herein, the term "computer program" is meant to include any sequence of human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "application" refers generally to a unit of executable software that implements theme-based functionality The themes of applications vary broadly across any number of disciplines and functions (such as e-commerce transactions, shipping transactions, entertainment, calculator, Internet access, etc.), and one application may have more than one theme. The unit of executable software generally runs in a predetermined environment; for example and without limitation, the unit could comprise a downloadable Java Xlet™ that runs within the JavaTV™ environment.

As used herein, the term "database" refers generally to one or more tangible or virtual data storage locations, which may or may not be physically co-located with each other or other system components.

As used herein, the term "network" refers generally to data or communications networks regardless of type, including without limitation, LANs, WANs, intranets, internets, the Internet, cable systems, telecommunications networks, satellite networks, and Virtual Private Networks (VPNs), or collections or combinations thereof, whether based on wired, wireless, or matter wave modalities. Such networks may utilize literally any physical architectures and topologies (e.g. ATM, IEEE-802.3, X.25, Token Ring, SONET, 3G/3GPP/UMTS, 802.11, Hybrid fiber-coax (HFC), etc.) and protocols (e.g., TCP/IP, HTTP, FTP, WAP, GPRS, RTP/RTCP, WiFi, 3G, IEEE 802.11, etc.).

As used herein, the term "service provider" refers generally to services provided remotely to the user including, for example, data streaming, data analysis, financial account management and trading, data archiving and storage, Internet access, content delivery, telecommunications, etc.

As used herein, the term "speech recognition" refers to any methodology or technique by which human or other speech can be interpreted and converted to an electronic or data format or signals related thereto. It will be recognized that any number of different forms of spectral analysis (such as MFCC (Mel Frequency Cepstral Coefficients) or cochlea modeling, may be used. Phoneme/word recognition, if used, may be based on HMIM (hidden Markov modeling), although other processes such as, without limitation, DTW (Dynamic Time Warping) or NNs (Neural Networks) may be used. Myriad speech recognition systems and algorithms are available, all considered within the scope of the invention disclosed herein.

As used herein, the term "CELP" is meant to include any and all variants of the CELP family such as, but not limited to, ACELP, VCELP, and QCELP. It is also noted that non-CELP compression algorithms and techniques, whether based on companding or otherwise, may be used. For example, and without limitation, PCM (pulse code modulation) or ADPCM (adaptive delta PCM) may be employed, as may other forms of linear predictive coding (LPC).

As used herein, the term "digital processor" is meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, and application-specific integrated circuits (ASICs). Such digital processors may be contained on a single unitary IC die, or distributed across multiple components.

As used herein, the term "integrated circuit (IC)" refers to any type of device having any level of integration (including without limitation ULSI, VLSI, and LSI) and irrespective of process or base materials (including, without limitation Si, SiGe, CMOS and GAs). ICs may include, for example, memory devices (e.g., DRAM, SRAM, DDRAM, EEPROM/Flash, ROM), digital processors, SoC devices, FPGAs, ASICs, ADCs, DACs, transceivers, memory controllers, and other devices, as well as any combinations thereof.

As used herein, the term "display" means any type of device adapted to display information, including without limitation CRTs, LCDs, TFTs, plasma displays, LEDs, and fluorescent devices.

Overview

The present invention allows users at a POD or other location to rapidly and easily ship their chattels to another location, such as to their travel destination or public gathering place (concert, amusement park, sporting event, etc.), to their home, or even a third party. As is known, millions of personal prohibited items are collected each year at airport security points alone. Faced with the choice of discard or abandoning the item(s) or canceling their travel, the great majority of people choose to abandon the chattel, or perhaps attempt to recover it later. Massive amounts of such items are collected each day throughout the nation's airports.

In its simplest form, the mechanism for shipment comprises a human agent and/or drop box akin to those used for Fedex or other comparable courier services, that is disposed adjacent to the security checkpoint of the POD. Standard courier methods are used, which may be aided through the use of more sophisticated apparatus and techniques so as to facilitate rapid and cost effective use by the customer. A variety of coding and/or tracking methods may be used, including bar codes, magnetic strips, and RFID tags of the general type well known in the art. These techniques may also be used in conjunction with one another, such as to perform different functions at different points throughout the processing or transit chain of the chattels.

In more sophisticated embodiment, personal electronics ranging from user-specific RFID devices, USB keys, PDAs, handhelds, cell phones or the like are used to transfer information to and/or from the kiosk or other processing entity associated with the service.

Description of Exemplary Embodiments

It is noted that while the system and methods of the invention disclosed herein are described with respect to point-of-departure (POD) management of chattels, such as might occur at an airport or other transportation facility, certain aspects of the invention may be useful in other applications, including, without limitation, other types of transaction relating to chattels, such as insuring or valuation thereof, courier services between two non-POD locations, etc.

Referring now to FIG. 1, a first embodiment of a system utilizing radio frequency identification (RFID) tags is described. The system 100 comprises generally one or more shipping elements 104 with associated tags 106, and a parent device 102 (e.g., kiosk). The kiosk 102 contains an RF antenna 105, as well as interrogator/reader module 108 and analysis/display module 110. It will be recognized by those of ordinary skill that the various components and modules being part of the system 100 may be combined or integrated into one physical device as applicable, or separated, modularized, or any combination thereof, the illustrated embodiment being merely exemplary.

The tags 106 of each shipping element comprise radio frequency ID tags (RFID). RFID tags are well known in the communications art. The main advantages of an RFID sensor and tag system over other forms of ID tagging include (a) the orientation of the tag with respect to the sensor is not critical for a correct read of the tag information; (b) communication can occur within comparatively harsh operating environments; and (c) the communication range between the sensor and tag can be significant even when the RF frequencies used are within the power limitations of Federal Communications Commission (FCC) rules concerning unlicensed transmitters. Accordingly, RFID technology is useful for several applications, especially those relating to asset inventory and management. RFID tags or various configurations are now ubiquitous and available at extremely low cost, thereby further enhancing the economic viability of the present invention.

The process of "reading" and communicating with an RFID tag such as that used in the system 100 of FIG. 1 comprises bringing a RFID tag within proximity to an RFID sensor ("reader") 108 which emanates a radio frequency or electric wake-up field having a limited range. The RFID tag 106 detects the presence of the wakeup field of the reader 108, and subsequently various forms or protocols of handshake occur between the tag 106 and the reader 108 in order to exchange data. All of this communication between the tag and the sensor is performed using, e.g., RF carriers (or even wideband waveforms) of one or more prescribed frequencies. As is well known in the art, so-called "low-frequency" systems operate in the kHz (e.g., 125 kHz) to low-MHz range (unlicensed). Low frequency systems are generally low cost and complexity and have comparatively limited range, but are attractive since the low frequency nergy tends to suffer low losses from materials like metal, polymers, tissue, and the like. High-frequency systems operate in the low-MHz to GHz range (sometimes licensed). High-frequency systems in general have greater range, but are more directional. Additionally, the performance of these high frequency tags may be adversely affected by electromagnetic radiation or proximate metallic objects.

Additionally, RFID tags are generally categorized as being "active" (i.e., carry an associated power source for operation of the on-tag integrated circuit, and are capable of spontaneous transmission after reader interrogation), or "passive" which utilizes incident RF energy or electric field (from the reader, for example) to generate electrical energy for use by the IC, and transmission. Passive tags are highly energy efficient, and require only an extremely small amount of electrical power to function.

In the present application, due to the premium on space and desire for ultra-light weight and low cost, a small antenna and package form factor is desired. This also avoids disincentives to the disposability of the device (and its parent shipping element). Based on the foregoing considerations, the present embodiment of the invention utilizes a low frequency (e.g., 125 kHz nominal) miniature passive tag having a miniature monopole antenna 109 of the type well known in the art, although it will be recognized that active tag architectures, lower or higher frequency systems, and alternate antenna configurations (such as "FIG. 8" loop, etc.) may be used depending on the particular application and desired attributes. Passive tags are a preferred mode, yet active tags are a utilitarian and desirable mode as well for certain applications.

The RFID tag 106 of the present invention further optionally includes an integrated circuit (IC) device (not shown) including a transceiver section and processing logic, as well as an integrated random access memory (RAM) device of the type commonly available with such devices adapted to store a plurality of data bytes such as data correlating to the identity of a given user, its date of deposit, its location (i.e., Terminal A at Airport B), destination, urgency/priority, contents classification (e.g., metallic, hazardous, etc.), weight as deposited, user's destination (if different from the shipping destination), contact information, etc. and the like. The memory device may also comprise, without limitation, PROMS, EPROMS, EEPROMs, UVEPROMS, SRAMs, DRAMs, SDRAMS, "flash" memory, and ferroelectric memory devices. In this capacity, the construction of the parent shipping element 104 is simplified, and less complex "off the shelf" RFID devices meeting the physical space limitations may be used with little or no adaptation.

In an exemplary embodiment, the RFID tag is distributed on one or more surfaces of the shipping element using a capacitive type substrate tag. See for example the "Bistatix™" RFID devices previously manufactured by Motorola/Indala Corporation (now ASSA ABLOY). These devices utilize a very thin, lightweight and low cost substrate employing non-metallic printed circuit technology. They are also extremely rugged, allowing for bending, crumpling, folding, etc., and can be printed on many different types of dielectric substrates. They also utilize an extremely small IC, capable of storing a limited amount of data (e.g., 96 bits), thereby mitigating the costs associated with the shipping element 104, and its overall form factor. It will also be recognized that the shipping element surface(s) may be used as the substrate itself, thereby further reducing cost. In short, the "tag" can be printed and/or embedded onto or in the shipping element (box, envelope, carton, canister, etc.) at manufacture or thereafter in a highly cost-efficient manner. It will be recognized that capacitive or inductive tags may be used consistent with the invention.

Hence, by employing this (e.g., Bistatix) technology within the element 104 of the present invention, the RFID tag may be disposed on any surface at extremely low cost and low profile. A complementary Motorola Bistatix reader may be used as the reader 108 of FIG. 1, although other configurations may be used as described elsewhere herein.

In operation, the tag "reader" 108 of FIG. 1 interrogates the element(s) 104 and RFID device 106 at its designated frequency, causing the tag to "wake" and initiate communications protocols disposed within the tag IC/memory. Once such protocols are established, the reader transmits preformatted data representative of the parameters desired to be loaded into the RFID memory device. For, example, a box of "smart" envelopes 200 (described below with respect to FIG. 2a) can be swiped by the interrogator/reader 108 before use in the kiosk and encoded with identifying information, such as for example the airport/POD identification code, date of coding, etc. The envelopes or other elements 200 can optionally be sequentially encoded with numbers (e.g., envelope No. 1, 2, 3, etc.) to distinguish one from another. Alternatively, the tags 106 associated with the elements 200 can be pre-coded at manufacture, such as via slightly variant frequency of emission, etc. A variety of different approaches for distinguishing between two similarly situated shipping elements are well known to those of ordinary skill in the RFID arts, and accordingly are not described further herein.

As can be readily appreciated, the ability to uniquely identify a plurality of different shipping elements 104 using RF technology has great implications for, inter alia, accounting for such elements during use, security scanning and shipment. Herein lies a primary attribute or feature of the present invention; i.e., tracking and control of a number of different parcels or elements 104. For example, the present invention allows the system operator to rapidly inventory and specifically identify particular elements 104 before shipment, and afterwards (i.e., during delivery to the user or designated recipient), thereby easily and efficiently accounting for all elements 104. This is also useful during security scanning, and inventory before loading on the selected transportation mode (aircraft, etc.); e.g.. to verify that no one such as a terrorist has surreptitiously inserted a "dummy" package into the transport bin or other mechanism between unloading of the kiosk and loading onto the aircraft. It will also be recognized, however, that the kiosk or other receptacle (or portion thereof) may simply be made mobile and securable such that it can be directly transferred to the aircraft without having to load or unload, thereby potentially frustrating attempts to gain unauthorized access thereto.

The RFID tags 106 of the embodiment of FIG. 1 has further utility for conducting inventory of "smart" shipping elements after manufacture. Since each element carries it's own tag, each capable of uniquely identifying itself (whether by unique frequency assignment, or data encoded on the tag memory and transmitted to the reader), rapid reading of a plurality of tags disposed in close proximity to one another is possible. For example, a manufacturer, distributor or POD could also use the system 100 of the present invention to control inventory (such as by placing a reader at a "choke point" of a storage facility, thereby knowing precisely when each "smart" element 104 was brought in or out of the facility), or determine when a re-order of supplies is needed. Using the wireless data interface capabilities described subsequently herein, the kiosk can even automatically alert a supplier that it needs more shipping elements, akin to well known prior art CDPD approaches used for, inter alfa, vending machines.

In yet another embodiment, the tag reader 108 is placed at the door or portal to the room or space (e.g., airport ingress/egress) by which a subject must pass, thereby necessarily exposing the subject to the interrogation field generated by the reader 108. Hence, where someone such as a terrorist attempts to obtain one or more elements 104 for unauthorized use (such as to try to sneak a package into a bin of authorized elements 104) from the kiosk, a security perimeter is established and interrogation automatically conducted. This security perimeter can be quite small, such that anyone attempting to steal or smuggle in coded envelopes or containers 104 from the kiosk will trigger a proximity sensor based on the aforementioned interrogation.

Another feature of the present invention is coordination of the type of tag used, its frequency, its radiated power, etc., thereby allowing the user to control the range at which the interrogation field generated by the reader 108 will elicit a response from the tag 106. It is undesirable to have the tags 106 respond at too great a distance, since this would necessitate removing the shipping elements in question and the reader 108 from the proximity of other devices in order to perform an inventory (i.e., the user would not be able to spatially differentiate between various tagged shipping elements 104). Hence, the aforementioned low-power low-frequency passive tag is well suited to such applications. In the exemplary embodiment, the foregoing parameters are controlled such that the tag reader 108 has an effective "wake up" range of 1-3 ft., thereby allowing sufficient spatial resolution; however, this value can clearly be adjusted as need in the particular application. For example, in the "exit door" reader embodiment described elsewhere herein, a wake-up field lobe having a main axis of 5-10 feet may be needed to ensure adequate tag coverage as personnel ingress/egress.

The RFID tag 106 and reader 108 of the present invention, as well as other wireless or wired data links associated with the apparatus 100, may also optionally utilize an encrypted data protocol, such that any transmissions from the tag 106 are encrypted, and accordingly must be decrypted by the authorized reader 108 before processing of the tag data, and/or writing of the tag 106 by the reader 108, is permitted. Such encryption may be applied using any number of well known techniques instituted at the protocol level, or even at the air interface. For example, in one embodiment, the RFID tag 106 and reader 108 comprise more complex variant having a direct sequence spread spectrum (DSSS) communication system incorporating a PN (pseudo-noise) spreading code of the type well known in the communications art. In another embodiment, a frequency hopping spread spectrum (FHSS) having a hopping sequence is used to enhance security. The use of multi-bit encryption/encrypted data protocols and spread spectrum techniques for security is well known in the art, and accordingly will not be described further herein. See U.S. Pat. No. 5,539,775 entitled "Modulated spread spectrum in RF identification systems method" issued Jul. 23, 1996, and U.S. Pat. No. 5,629,981 entitled "Information management and security system" issued May 13, 1997, both incorporated herein by reference in their entirety.

In addition or instead of the air interface, encryption may also be applied at the protocol level, such as where public/private key methods, IKE, IPSec, or other techniques may be used to frustrate surreptitious interception or alteration of data transmitted to/from the RFID device, or between other components. Furthermore, well known VPN or other tunneling protocols for encapsulating data during transmission across an untrusted network may be used between various entities of the present system, such as between a kiosk and a local distribution or management node.

Additionally, well known secure socket layer (SSL) or equivalent approaches may be employed across one or more links of the network(s), so as to enhance security.

It will be appreciated that many different variations and combinations of the foregoing radio frequency communications apparatus and methods may be employed consistent with the invention; such different variations and combinations being too numerous to describe herein. All such variations and combinations, however, are easily recognized and within the possession of those of ordinary skill.

As shown in FIG. 1, the receptacle module 110 takes the data obtained from the tags 106 via reader 108 and analyzes it according to one or more algorithms. In the illustrated embodiment, the module 110 comprises a CISC or RISC processor having one or more computer programs running thereon, the programs analyzing the digitized tag data and for example, comparing it to stored data representing a series of allowed or authorized ID values for shipping elements 104, hence enhancing security. The receptacle can also be selectively locked until the reader 108 and module 110 validate the authenticity or other information associated with the particular transaction (including, e.g., user payment authorization, maximum allowed weight, size restrictions, etc.). To this end, the kiosk can be configured with an electronic scale integrated with the tag reader 108, or other complementary systems. In terms of size, the code of each shipping element 104 advantageously helps the system automatically determine the maximum size of the package; i.e., the family designation of each element 104, when read by the reader 108, tells the central processor that the package cannot physically be larger than certain dimensions.

It will further be recognized that each item of inventory or shipment can have associated with it other descriptive data, as shown in the example below:

| ID Code | Category | Description | Owning entity | Transaction date | Routing Number |
|---|---|---|---|---|---|
| 0001 | Airport POD Shipping | 10 × 12 Envelope | PHL/A | Dec. 25, 2003 | 0000-1111-2222-3333 |

This descriptive data can, in whole or part, also be produced during a discrepancy alert (or when merely performing a normal transaction) to help identify the item in question.

As can be appreciated, the analysis/display functionality of the module 110 may also be provided by or integrated with another device. For example, so as to reduce clutter or space requirements, an existing device such as a Fedex or Airborne drop box, ATM machine, Internet or WiFi kiosk, flight insurance kiosk, etc. may be used as the parent platform for the reader 108 and/or module 110. Many existing devices include sufficient processing and storage capacity to perform the transaction processing function(s) along with those normally required by that equipment, and hence can be readily programmed or otherwise adapted by those of ordinary skill to accommodate the functionality described herein. As yet another alternative, a standard desktop or laptop PC, or airport boarding gate terminal may be used to provide the desired analysis/display functionality, such as where the user gets the item through security, yet none-the-less desires to ship the item rather than carry it on the aircraft.

As yet another alternative, the reader 108 and analysis/display module 110 may be integrated into a single device 170 (FIG. 1*a*), such as a handheld device akin to portable GPS receivers now ubiquitous. The user (which may be an employee, or even the shipper) may simply then pick up the unit, interrogate the items to be shipped (thereby encoding the package and retrieving ID data for the database in data communication with the handheld), and then deposit the package in a one-way access receptacle (which may also be interlocked with the handheld via wired or wireless link if desired).

As previously referenced, it will be recognized that the methods of the invention (as exemplified in FIG. 1) are ideally embodied in the form of one or more computer programs. Such program(s) may be rendered in virtually any programming language/environment including for example C, C++, Java, Fortran, Basic, Visual Basic, Unix, Perl, CORBA, or any other medium capable of reasonably implementing such a functionality.

In one exemplary embodiment, the reader module 108 comprises an antenna portion with embedded antenna 105, the latter being either monopole or dipole as desired to interface with the antenna structure of the tag 106 at the selected centerline frequency(ies). The antenna 105 of the module of the exemplary embodiment generates the wakeup or interrogation field needed to elicit a response from the tag 106 when the module is brought in sufficient proximity to the tag or vice-versa. The interrogation field intensity can also be made adjustable by the user, such that each facility can "tune" its module to the desired range/sensitivity. This adjustment can also be accomplished automatically and/or algorithmically (such as under control of the kiosk's central processor previously described herein, or an associated microcontroller).

The reader module 108 is also optionally equipped with a RF transceiver, such as a Bluetooth 2.4 GHz or IEEE-802.11a/b/g device, for communications with other entities, such as a local server or wireless gateway to another network.. For example, the SiW1502 Radio Modem IC manufactured by Silicon Wave Corporation of San Diego, CA, is a low-power consumption device with integrated RF logic and Bluetooth protocol stack adapted for Bluetooth applications. The chip is a fully integrated 2.4 GHz radio transceiver with a GFSK modem contained on a single chip. The SiW1502 chip is offered as a stand alone IC or, may be obtained with the Silicon Wave Odyssey SiW1601 Link Controller IC. The SiW1502 form factor is 7.0×7.0×1.0 mm package which is readily disposed within the interior volume of the kiosk described herein, or even a portable reader or "wand" which may be used by the carrier, such as for providing hand scans of chattels. An RF transceiver and modulator device is adapted to generally comply with the well known "BluetoothTm" wireless interface standard, IEEE-802.11, UWB, or alternatively, so-called "3G" (third generation) communications technologies. The Bluetooth wireless technology allows users to make wireless and instant connections between various communication devices, such as mobile devices (e.g., cellular telephones, PDAs, notebook computers, remote monitoring stations, and the like) and desktop computers or other fixed devices. Since Bluetooth uses radio frequency transmission, transfer of data is in real-time. The Bluetooth topology supports both point-to-point and point-to-multipoint connections. Multiple 'slave' devices can be set to communicate with a 'master' device. The devices are authenticated (optionally) using a RAND-based bonding or pairing process of the type well known in the art (e.g., in Mode 3 link layer security, or Mode 2 "L2CAP" or service-based security). In this fashion, the kiosk/reader of the present invention, when outfitted with a Bluetooth wireless suite, may communicate directly with other Bluetooth compliant mobile or fixed devices including a subject's cellular telephone, PDA, notebook computer, desktop computer, or other kiosks. Alternatively, a number of different RF-enabled "wands" performing chattel scanning may be monitored in real time at a centralized location, such as the kiosk or even a remote location using the kiosk or a local wireless gateway as a proxy node.

Bluetooth-compliant devices, inter alfa, operate in the 2.4 GHz ISM band. The ISM band is dedicated to unlicensed users, including airports, thereby advantageously allowing for unrestricted spectral access. The exemplary modulator uses one or more variants of frequency shift keying, such as Gaussian Frequency Shift Keying (GFSK) or Gaussian Minimum Shift keying (GMSK) of the type well known in the art to modulate data onto the carrier(s), although other types of modulation (such as phase modulation or amplitude modulation) may be used.

Spectral access of the device is accomplished via frequency hopping spread spectrum (FHSS), although other approaches such as frequency divided multiple access (FDMA), direct sequence spread spectrum (DSSS, including code division multiple access) using a pseudo-noise spreading code, or even time division multiple access may be used depending on the needs of the user. For example, devices complying with IEEE Std. 802.11 a/b/f/g may be substituted for the Bluetooth transceiver/modulator arrangement previously described if desired. Literally any wireless interface capable of accommodating the bandwidth and/or other requirements of the system may be used.

For example, in the case of an airport, the UWB system described below may be considered optimal, due to its low radiated power level, e.g., less than −41.3 dBm/MHz according the FCC unlicensed spectral UWB mask issued circa late 2003. This low power reduces the chance of deleterious interference with, e.g., aircraft communications systems, IFF systems, or other instrumentation or control functions.

In yet another embodiment of the invention, the module 400 utilizes an ultra wide-band (e.g., TM-UWB, OFDM, etc.) protocol for communication with other entities. Specifically, in one embodiment, the module 400 is fitted with a TM-UWB SoC device which utilizes pulse-position modulation (PPM), wherein short duration Gaussian pulses (nanosecond duration) of radio-frequency energy are transmitted at random or pseudo-random intervals and frequencies to convey coded information. Information is coded (modulated) onto the short duration carrier pulses by, inter alfa, time-domain shifting of the pulse. For example, a pulse encodes a bit by being temporal shifting of the pulse with respect to a reference, such that a "late" pulse encodes a "0", while an early pulse encodes a "1". This scheme is somewhat akin to the well known frequency shift keying (FSK), wherein two (or more) side-band frequencies are utilized to encode data; e.g., 67 kHz down-shift=0; 67 kHz up-shift=1. TM-UWB devices have the advantage of ready penetration of various mediums, as well as ultra-low power consumption and low spectral density, thereby reducing power requirements and potential interference with other device, respectively. In one exemplary variant, the TM-UWB device of the invention comprises a half duplex, 2.0 GHz with variable data rate in excess of 1 Mbps with no forward error correction (FEC). The Gaussian monopulse is of the form:

$$V(t)=(t/\tau) \, e^{-(t/\tau)2}$$

Where $\tau$ is a time decay constant related to the Gaussian monopulse duration, and center frequency $f_c=k/\tau$. The monopulse's bandwidth and center frequency are therefore directly related to the monopulse's temporal width or duration. This approach also shifts the transmission time of each monopulse over a significant time interval in accordance with a pseudo-nose (pn) "hopping" code of the type well known in the art, thereby advantageously distributing spectral density to make the spread. This approach is roughly comparable to frequency hopping spread spectrum (FHSS) except in the time domain. Exemplary devices incorporating TM-UWB components including the timer, correlator, and digital baseband signal processor and controller units (not shown) are available from IBM Corporation (SiGe or silicon germanium-based) in the form of a chip set, although it will be recognized that an integrated single device is optimal for the invention. Additional detail on the implementation of TM-UWB systems is found in, e.g., "Time Modulated Ultra-Wideband for Wireless Applications"; Time-Domain Corporation, 2000, which is incorporated herein by reference in its entirety.

By using ISM or UWB communications, the RF module can also advantageously communicate with its parent device (e.g., a central node or gateway, another kiosk 110 with transceiver, etc.) without mutual interference with the RF signal of the tags 106, the latter operating at 125 kHz in the nominal embodiment.

Figure 1B:
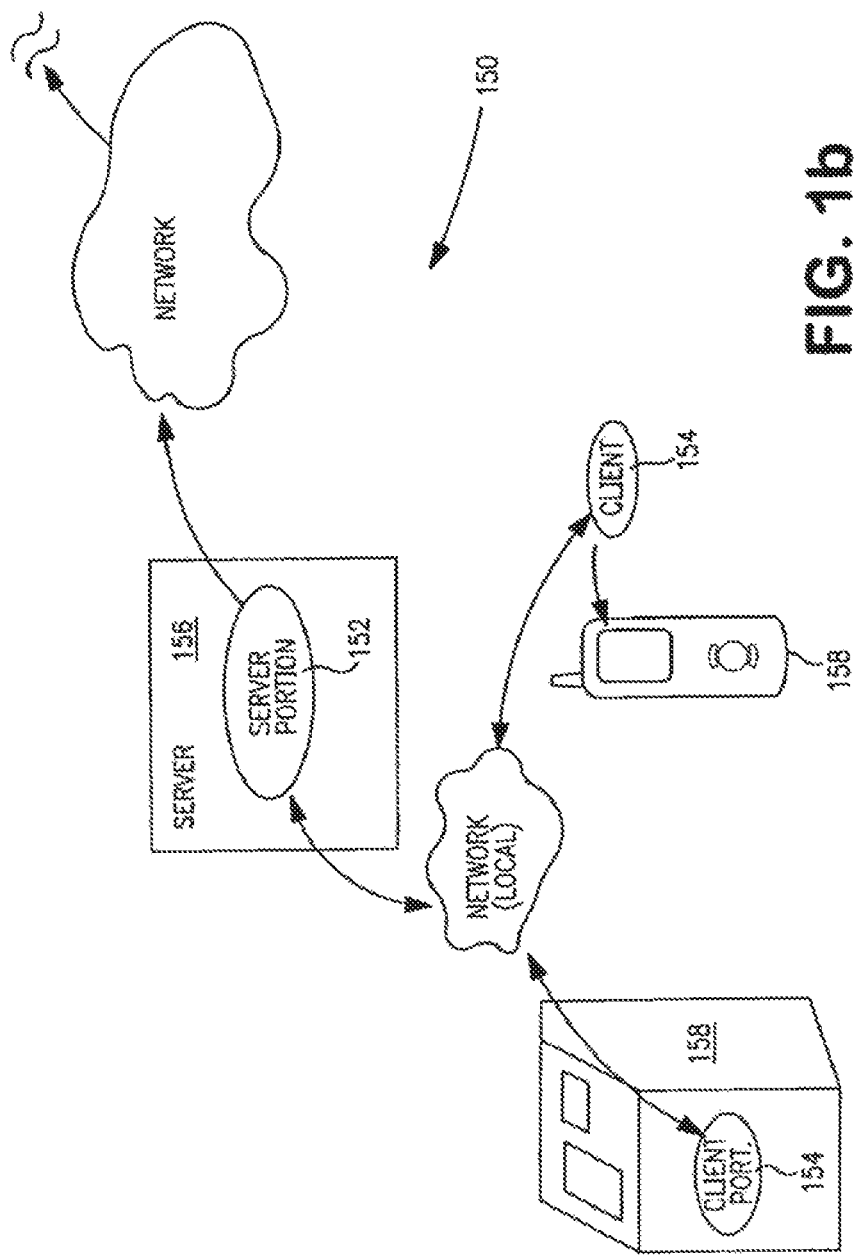
FIG. 1b is a block diagram of one exemplary local network topology useful with the chattel management system FIG. 1.

In another exemplary embodiment of the system, an object-oriented distributed program having client and server portions distributed on respective client and server devices is utilized (Fig. 1b). As used herein, the terms "client device" and "personal electronic device" (PED) include, but are not limited to, personal computers (PCs), whether desktop, laptop, or otherwise, personal digital assistants (PDAs) such as the Apple Newton®, "Palm®" family of devices, handheld computers such as the Hitachi "e-Plate" or Dell Axim, personal communicators such as the Motorola Accompli devices, Motorola EVR-8401, J2ME equipped devices, cellular telephones, set-top boxes, or literally any other device capable of interchanging data with a network. Such devices may interface using wired or optical fiber mechanisms such as an IEEE Std. 802.3 Ethernet interface, Digital Subscriber Line (DSL), V.90 modem, DOCSIS modem, hybrid fiber-coax (HFC) cable, or alternatively via wireless mechanisms and protocols such as IS-95/CDMA-2000, BluetoothTM, IrDA interface, IEEE Std. 802.11(a) or (b), Wireless Application Protocol (WAP)/WTLS, GPRS, GSM, third-generation or "3G" systems (3GPP/UMTS), or any other of myriad data communication systems and protocols well known to those of skill in the communications arts. Creation of such computer programs is readily accomplished by those of ordinary skill in the programming arts, and accordingly is not described further herein.

As shown in FIG. 1b, the distributed software embodiment of the architecture 150 utilizes a server portion 152 and client portion 154 distributed on respective server 156 and client devices 158, ostensibly disposed at different physical locations, and in data communication with each other via a network 160. The client portion 154 of the software can be made "thin" to accommodate the comparatively lower hardware capabilities associated with many client devices 158. This architecture 150 is especially well suited to an object oriented programming environment (e.g., CORBA), as will be recognized by those of ordinary skill. In use, the user manually or automatically establishes communication between the client device and the sever portion, thereby allowing for transfer of data relevant to the impending transaction, such as the user's home address, credit card or payment information, etc. This approach obviates the user having to (i) stand at the kiosk and enter the information manually, and (ii) saves time since the link can be established while the user is performing other tasks, such as walking to the security checkpoint, parking their car, etc. Hence, the user merely need walk to the kiosk, insert their chattel into a shipping element 104, and deposit it on the reader 108. When authenticated and encoded, the receptacle will open to allow the element 104 to gravity feed into the locked receptacle. Alternatively, the encoding can be performed after entry into the receptacle (so as to frustrate surreptitious encoding and removal).

The aforementioned communication channel between the client device and module/server can also be used for two-way (i.e., forward and reverse channel) traffic, such as where transaction information is transmitted back to the client device for storage thereon. Alternatively, such information may be transmitted to a third party or proxy, such as to an e-mail server or URL, wherein the information is directly or indirectly provided to the user (such as via a direct confirmatory e-mail, or as a line item on a monthly statement). The transmitted information may optionally include date/time, user ID, location, routing or tracking number, payment method, and even other information such as the weight of the shipment, results of a security scan (e.g., by an installed e-beam, X-ray, neutron, magnetometer, or chemical "sniffer" device co-located with the kiosk), an image of the tracking label, estimated time/date of delivery, addressee, listing of contents, etc. The transfer of information to the client device may be fully automated, conditional upon assent from the user, or fully manual as desired.

The foregoing architecture may also be used to remotely initiate processes on other devices, such as PEDs, "smart" phones, network agents, or home PCs. For example, in one exemplary variant, the client device software is programmed to initiate an O/S window or Java applet running on a J2ME or equivalent equipped distant (e.g., PED) device upon transmission of a prompt corresponding to a given event. The window or applet includes a user name/password feature, wherein the distant user may instruct their client software to initiate certain algorithms or actions, such as transmission of personal information. In one embodiment, a WAP 2.0 client and proxy are utilized. Alternatively, of course, the distant end user may access the desired target IP address or other network node via the Internet or comparable network directly via the PED, thereby effectuating the desired transaction.

In another embodiment of the invention, a SIP (Session Initiation Protocol) enabled device or comparable is used to establish a secure user session to transmit the required information. In one variant, a "PoC" (push-to-talk {PTT} over cellular) approach is used, wherein the user's mobile device includes an architecture that supports instantaneous communications via, e.g., the aforementioned SIP protocol layered over a UMTS IMS architecture of the type well known in the communications arts. For example, the user's client process can be configured to instigate a PoC session upon the user selecting the chattel proxy or application server as a "buddy" and invoking a PTT transmission. So-called "PTx" or "push-to-anything" technology may be used for this purpose; e.g., pre-formatted packages of data necessary to perform chattel management or related functions can be immediately transmitted to the desired receiver via a one-button transmit functionality. These packets may be encapsulated for security purposes, e.g., via an application layer or other protocol such as Digest, IPSec, MIKEY, etc. Alternatively, where Bluetooth is utilized, the proxy or application server can conduct a (e.g., user-permissive) object pull according to the K-11 or OBEX profiles.

The proxy or application server may also require authentication of the user (or mutual authentication) before any data push or pull is allowed, such as via a RAND challenge-based approach or the like. This helps mitigate "spoofing" or surreptitious denial of service to the user, and substitution of an unauthorized device in place of the true chattel owner, or reception of the user's personal data by an unauthorized device.

In another embodiment, the user's cellular telephone equipped with Assisted GPS (A-GPS) or other such locating system can be used to provide forwarding information. Specifically, in one variant, the user's A-GPS system is prompted to save the coordinates of a particular location where the package must be delivered. For example, a user may want his chattel shipped to a third party where he/she is presently located. The user can merely push a soft function key on their client process, the soft function key either saving the coordinate for a later time/date, or transmitting it to a designated agent (such as the chattel management proxy) described elsewhere herein. That way, the user can merely specify the saved/transmitted location as the destination, without having to remember addresses, zip codes, etc. for the destination. Alternatively, the user can maintain a log or listing of saved GPS coordinates (and or address information) for easy recall at a later date.

In a manner somewhat analogous to the A-GPS, the user can also use their client process to exchange information with other user's devices (such as via a Bluetooth "discovery" process or OBEX object exchange). For example, a user may want their chattel shipped to a friend they are traveling with; the user can then handshake with their friend's device to pull/receive an electronic business card with the required delivery information. Such an approach may be useful where the chattel is rented out or intended for temporary use. Consider, for example, where the user rents a car, drives to the airport, leaves the car, and approaches the security checkpoint. The user can (while at the car rental agency) use either GPS location or "pushed/pulled" data as the basis for a communication to the chattel management system, the data instructing the latter as to where to return the car keys. Myriad other configurations will be recognized by those of ordinary skill provided the present disclosure.

In yet another exemplary embodiment, a user can utilize a more simplified device for communicating with the kiosk or module 110. For example, a coded RFID device (to be distinguished from that in the shipping element 104) may be used to automatically provide the kiosk/module 110 with the user's information, much in the way the prior art Mobil "Speed Pass" provides fueling station pumps with payment information, or the MasterCard Paypass system allows for commercial transactions. As another option, a USB key of the type well known in the art can be simply plugged into an accessible USB port of the module 110, thereby potentially both (i) transferring the user's information, and (ii) saving a user record of the transaction within the user's key. This approach can be coupled with the rapid drop capability described elsewhere herein, such that the kiosk associates a given chattel passed through its aperture or slot with a given user. For example, in one variant, the user simply places the chattel in a holding slot or receptacle, this action which prompts the user via a CRT, LCD, TFT, LEDs, audio prompt, or other UI to scan their RFID device past a sensor. After the kiosk controller/processor module and reader interrogates and retrieves the desired information from the RFID device (and also another entity or database, if desired, such as a pay authorization entity), the user is presented with a visual or other display of the shipping information, at which point the user may confirm or cancel. If confirmed, the kiosk then automatically opens the aperture or slot to receive the user's device. Internal mechanisms within the kiosk then either (i) tag the chattel as belonging to a particular user, such as via attachment of a tag or label, insertion in a "tagged" shipping element 104, diversion to a segregated chute or container, etc. Alternatively, the user can be prompted to affix a bar code, label, tag, or other identifying device, such as may be issued by the kiosk. Hand sorting of the various chattels may then be accomplished by personnel emptying the kiosk receptacle. In another embodiment, computer-readable purchase receipts using multi-dimensional bar codes of the type well known in the art, or other comparable mechanisms, may be used consistent with the invention for encoding the chattels and/or shipping elements 104.

As yet another alternative, the user may simply affix their personal RFID device to the chattel, scan as previously described (such as where the receptacle holding slot/aperture is integrated with or proximate the personal RFID reader), and authorize, at which point their chattel and their personal RFID device are collectively shipped to the destination. This variant obviates use of the second RFID device within the shipping element, since the user's RFID device contains all of the necessary information, some of which can be encoded onto the device at the time of scan at the kiosk. For example, the user's RFID device can be equipped to have sufficient storage capacity and to receive data from the kiosk reader/interrogator such that this encoding of additional information occurs seamlessly.

As yet another alternative, the kiosk may be fitted with a card reader adapted to receive cards pre-encoded ("prepaid") with a given monetary value. For example, as is well known, cards bearing magnetic media may be encoded at a remote terminal after the user deposits a given amount of currency. Such cards are currently employed, for example, in libraries where photocopy machines are present, or for telecommunications services. In the present context, the user might deposit a comparatively large amount of currency at the encoding terminal to encode or pre-pay for the deposited amount. Subsequent insertions of the card into the card reader read the encoded data (correlating to a currency balance remaining), subtract the amount of the current transaction, and then recode the card commensurate with the remaining balance. In this fashion, the user may avoid having to carry currency or change each time they wish to use the terminal; rather, they simply swipe or insert/retract the card from the reader/encoder, thereby automatically debiting the card.

As yet another alternative, a user's pre-paid cellular device can be exchanged for services in shipping their chattel. In one exemplary embodiment, the prepaid cellular device is configured to interface with the kiosk (such as via direct physical or wired connection, or wireless link such as RF, inductive, IRdA, or other) such that the service provider for the prepaid device authorizes payment of the chattel shipping via the cell phone/kiosk interface.

As even another alternative, the user who travels frequently can pre-code their devices using apparatus disposed at the POD, their home, or other locations. For example, in one embodiment, the user can attach an RFID devices to their chattels of any significant worth (e.g., cell phone, PDA, car keys, etc.) and encode them with their personal information. Alternatively, these devices may be disposed within the chattels at time of manufacture, and then encoded at or after purchase by the user. Once encoded, these devices can then be immediately scanned when placed in proximity to the reader 108 at the kiosk or other location. This obviates having to carry another currency source or personal RFID device.

In another embodiment, user-specific biometric data can be used alone or in conjunction with other data sources to authenticate or provide the required input to the kiosk. For example, in one variant, the user's fingerprint, retinal scan, facial recognition software scan, or voiceprint are used in a two-of-two, three-of-three, etc. coincidence circuit; i.e., when all inputs can be authenticated and correlated to one individual, the user's data is accessed (such as may be kept in a secure data facility in data communication with the kiosk or its proxy) and used as the basis for payment, shipping destination, etc.

In another embodiment, the system 100 can be coupled to the passenger reservation system operated by the relevant transportation agent (e.g., airline or travel agent), such that upon entry of the user's personal information, the reservation system is accessed to retrieve the user's destination and/or routing information. The option of "route to destination" can then be presented to the user, such as via a touch screen display on the kiosk, thereby allowing one-touch destination selection. Other options may include "home", "office", or any parties designated by the user either manually or via download of information from the personal RFID device or client device (e.g., PDA or cell phone).

The foregoing approaches also have the added benefit (to varying degrees) of reducing overhead costs associated with setting up and managing the trust, since electronic transactions/reporting are often more cost efficient that manual performance (such as by employees interacting with various entities in person or over the telephone or via mail).

It will also be recognized that use of the invention in a POD application may also carry certain economies of scale which can be exploited to the advantage of the carrier or others. For example, where many people traveling on an aircraft utilize the services described herein to forward their chattel to their travel destination, that same aircraft on which they are traveling can be used as the carrier mechanism for these chattels. Hence, if the shipping and security scanning procedures of the chattels can be accomplished rapidly enough, the chattels can optionally be loaded on the very same aircraft (or another traveling to that same destination), and provided to the traveler upon their egress from the aircraft using procedures which are in effect substantially the inverse of those described herein for registering/shipping the chattel.

In yet another embodiment, the shipping service provided to the user can be virtual in nature either in place of or in conjunction with the tangible services previously described. For example, where the user has an electronic device with important information (e.g., laptop, PDA, etc.), yet they are not allowed to take the device or magnetic media on the aircraft or other modality, they can (i) download the relevant information to a proxy agent (e.g., software process) running on the kiosk or its proxy, and direct the proxy agent to forward the information to a designated real or virtual storage location (such as an e-mail account, accessible URL, third party storage facility, etc.), and (ii) utilize the kiosk to physically transfer the device to a designated location. Hence, where the user simply needs a few data files from their PDA, they can download these using, e.g., a Bluetooth, WiFi, or other wireless link and encrypted protocols to the proxy, which then forwards the files via e-mail to an account accessible by the user at the destination. They then contemporaneously ship the device to their home for later retrieval.

It will also be recognized that depending on the configuration of the tag 106, it may be encoded at time of deposit (or before/after, such as via the user's PDA which can transmit data to the kiosk module 110 or a connected device) with various other types of information, including visual or voice data. Hence, the shipping element can carry audible instructions or information when decoded at the destination using an appropriate reader with audio capability. Hence, the package can also be authenticated to some degree by the recipient before opening it. Other types of information, including images, data, etc. can also be encoded into the shipping element.

In another variant, the kiosk may be equipped to generate photographic, IR, X-ray, spectrographic, or even holographic images of the chattel for, e.g., (i) electronic transmission to the user at the destination, such as where merely the appearance or other attribute of the device is important or sufficient; (ii) for a security or "purchase receipt" record of what was actually deposited at the kiosk, e.g., for insurance policy claim use or loss claims against the carrier; or (iii) use by the carrier in sorting a bin of chattels. In the case of option (iii), users may simply swipe their personal RFID device, which after authorization, results in the kiosk generating the image of the chattel, one (tactile or electronic) copy being provided to the user either directly or indirectly, such as via paper copy or e-mail to the user's designated account, and one for use by the carrier in sorting the receptacle. Other data relating to the chattel may also be obtained and encoded/transmitted, such as the item's weight, ferrous content/magnetization, electric field, luminance, fluorescence, or phosphorescence, fast neutron activation (FNA) signature, etc.

Figure 2C:
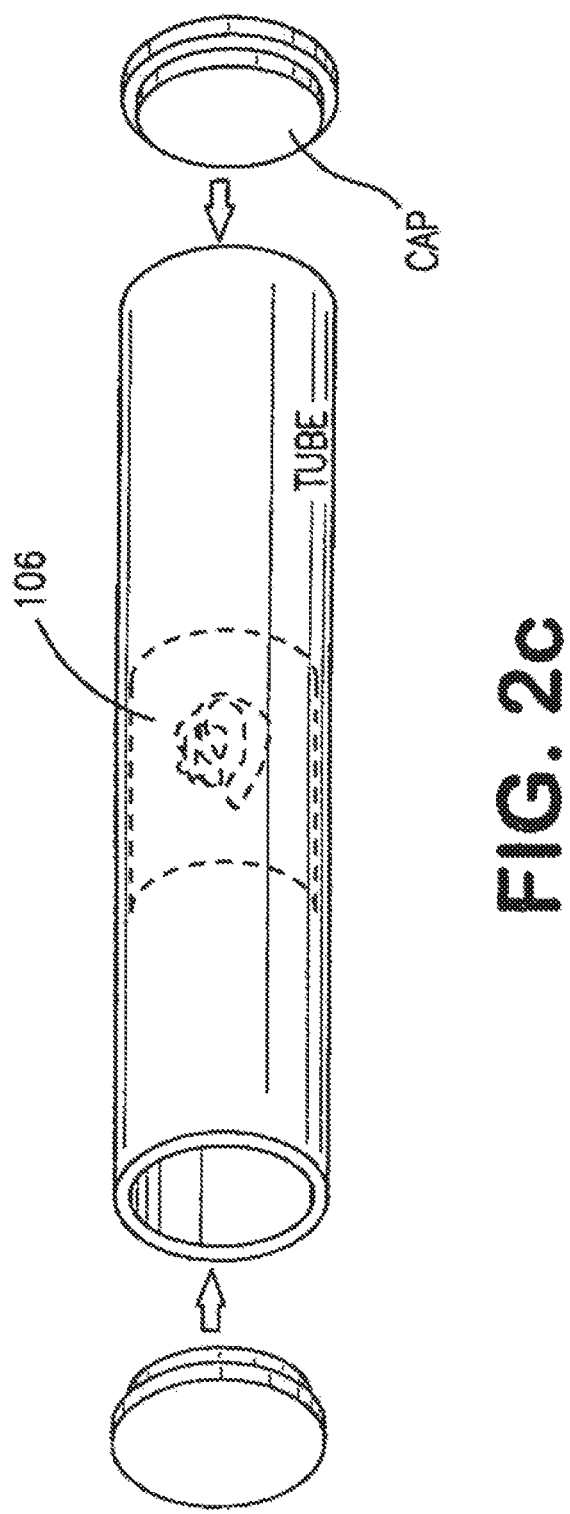

Referring now to FIG. 2a-2c, various embodiments of the "smart" shipping element 104 of the invention are described. In these embodiments, the RFID tag 106 is disposed within a soft, pliable substrate (which may be part of the shipping element 104 itself or otherwise mated thereto, such as using an adhesive). Ideally, the tag 106 is made as discreet as possible, thereby not alerting users to its presence. An envelope (FIG. 2a), box (FIG. 2b), and tube (FIG. 2c) are shown, although other forms may be used. The envelope pouch of FIG. 2a is ideally formed from a flexible material such as a polymer (e.g., polyethylene), Tyvek, or even paper, although other materials such as aramid fibers, elastomers, shrink-wrap or thermally responsive polymers, or flexible composites may be used as well. In yet another embodiment (not shown) the non-metallic conductive inks of the tag 106 are printed directly on the pliable material during manufacture (and the IC mated accordingly). The exemplary "Bistatix" tag 106 is generally substrate-agnostic, and therefore will operate suitably using the materials listed above or others.

It will be apparent from the foregoing discussion that myriad different types of shipping element 104 and tag 106 configurations may be used, the foregoing embodiment being merely exemplary. The receptacle/kiosk may be adapted to accept only certain shapes and/or sizes of element 104, thereby limiting what can be deposited therein.

In yet another embodiment, the kiosk can be configured to automatically package the chattel for the user, the latter merely depositing down a sized slot or aperture. The slot or aperture (in conjunction with other mechanical elements) creates an upper bound on the size of chattel that can be inserted. The user then merely swipes their personal RFID device past the reader, which encodes the tag 106 on the shipping element, seals the element 104, and charges the user's account based on the prevailing cost structure (e.g., weight/destination/priority/special handling). If for whatever reason the item cannot be processed, such as where it is too heavy or the user's payment method is refused, the kiosk merely activates a chute at the bottom of the kiosk to eject the user's chattel into a tray, much akin to a vending machine. Again, the slot or aperture can be actuated only upon conditions precedent if desired, such as authentication of the user's payment source, etc.

In another embodiment, the kiosk includes an LCD display and magnetic card reader of the type well known in the art e.g., similar to those commonly found on gasoline pumps. Such terminal also includes a "soft" keypad having a plurality of fixed or soft (programmable or software controlled) function keys. Such soft keypad may comprise, for example, a capacitive keypad, CRT-based "touch screen", LCD, TFT, or any other similar technology. It will be recognized that mechanical keys or button assemblies may also be used; however, such devices are generally less weather and foreign-matter resistant, and require greater maintenance. The function keys provide a number of different functions to the user, including a "print receipt" function (which may be coupled to a paper or electronic receipt functionality), debit/credit select keys, transaction acknowledgement key, as well as an alpha-numeric keypad for entering data such as passwords, Y/N inputs, etc. Such functions and technology are well known to those of ordinary skill in the electronic arts, and accordingly not described further herein.

Once the commands for the desired transactions have been received by the kiosk, the user is prompted and then selects their payment mode (e.g., debit card) via a fixed function key, and then swipes their card through the card reader. When the magnetic strip (or smart card) is read by the reader, the user's debit information is transferred to the processor of the terminal, wherein the algorithm running thereon next initiates a request for the user's password or "PIN" code via the display device (or alternatively via an audio interface driven by e.g., stored CELP voice data file, not shown). After the user enters the PIN code or password via the keypad, the authorization is obtained from the user's CCA or financial institution using any number of existing commercial financial transaction secure links well known in the industry. Once authorized, the controller of the controller issues a command to enable the reader 108 and, optionally unlock the locking device to allow insertion of the shipping element 104.

In yet another embodiment, the chattels of two or more users can be aggregated into a common shipment or shipping element 104 in order to reduce costs. For example, where a number of passengers in a security checkpoint are traveling to the same destination, and a plurality of them have chattels which cannot be taken on board, the users can pair up in groups of two or more and utilize a common shipping element. To this end, the POD facility, air carrier, etc. can also provide or facilitate such a service, such as where the air carrier provides a kiosk whereby all user's with rejected chattels can deposit their chattels for shipment to the destination via the passenger's aircraft or another aircraft/mode. This service may be provided either gratuitously or for a fee.

In another embodiment, the user, carrier or service provider can provide "stick-on" or otherwise selectively attachable RFID, bar code, magnetic strips, or even printed tags which the user can apply to their chattels for tracking. For example, in one case, the user can apply a number of pre-coded bar code labels to each of their chattels before travel (or even at the POD once they know that the chattel cannot be transported via the selected modality). The user then simply scans the label with a bar code reader provided a the kiosk (akin to a prior art supermarket checkout kiosk), and deposits the chattel in the receptacle (whether in a shipping element 104 or not) for subsequent handling by the carrier.

To this end, users can establish pre-existing accounts, much like a prior art Fedex or UPS account, whereby the payment, shipment, etc. information is already known by the carrier. Multiple different options can also be selected by the user such as, e.g., at time of scanning, wherein the CRT or other kiosk display device prompts the user to select a shipping destination, etc. The carrier can also utilize the aforementioned economies regarding co-location to make the service more cost efficient. For example, a kiosk at San Diego Airport is likely to receive a large number of chattels from people in the greater San Diego area requesting that the chattels be returned to their home address, thereby allowing for grouping of deliveries for greater economy.

Furthermore, "intelligent" kiosk management can be utilized, whether in operation and/or construction, so as to increase economies. For example, the kiosk or subsequent handling mechanisms can be configured to selectively sort the deposited shipping elements or chattels based on destination. Furthermore, the controller module of the kiosk can be programmed to alert a parent or proxy node of the need for unloading of the receptacle under certain conditions, such as when a sufficient number of items for a given destination are received. In order to reduce cost to the user, the latter may also be given the option to trade cost for latency; i.e., if a user can wait longer to get their chattel back, their cost of shipment can be lowered. This dynamic is particularly relevant to the present invention, since many travelers won't arrive back home for several days anyway, thereby increasing their tolerance to longer shipping delays.

This metric can also be managed by the kiosk or carrier, such as where kiosks are preferentially distributed (or alternatively are equipped with receptacles equating to different shipping priorities or delays) such that their users are skewed towards the relevant portion of the population. For example, a "long delay" shipment kiosk may be placed at the international terminal, a shorter latency kiosk may be suited better to the domestic or commuter flight terminals.

Also, the carrier or provider of the kiosk can coordinate with other carriers (such as Fedex or UPS) so as to intelligently schedule and manage distribution of the chattels to their destinations. For example, with data coupling of the kiosk carrier system with that of other carriers, and coordination there between, duplication of routes can be minimized, such as through a cross-carrier distribution agreement.

Figure 3:
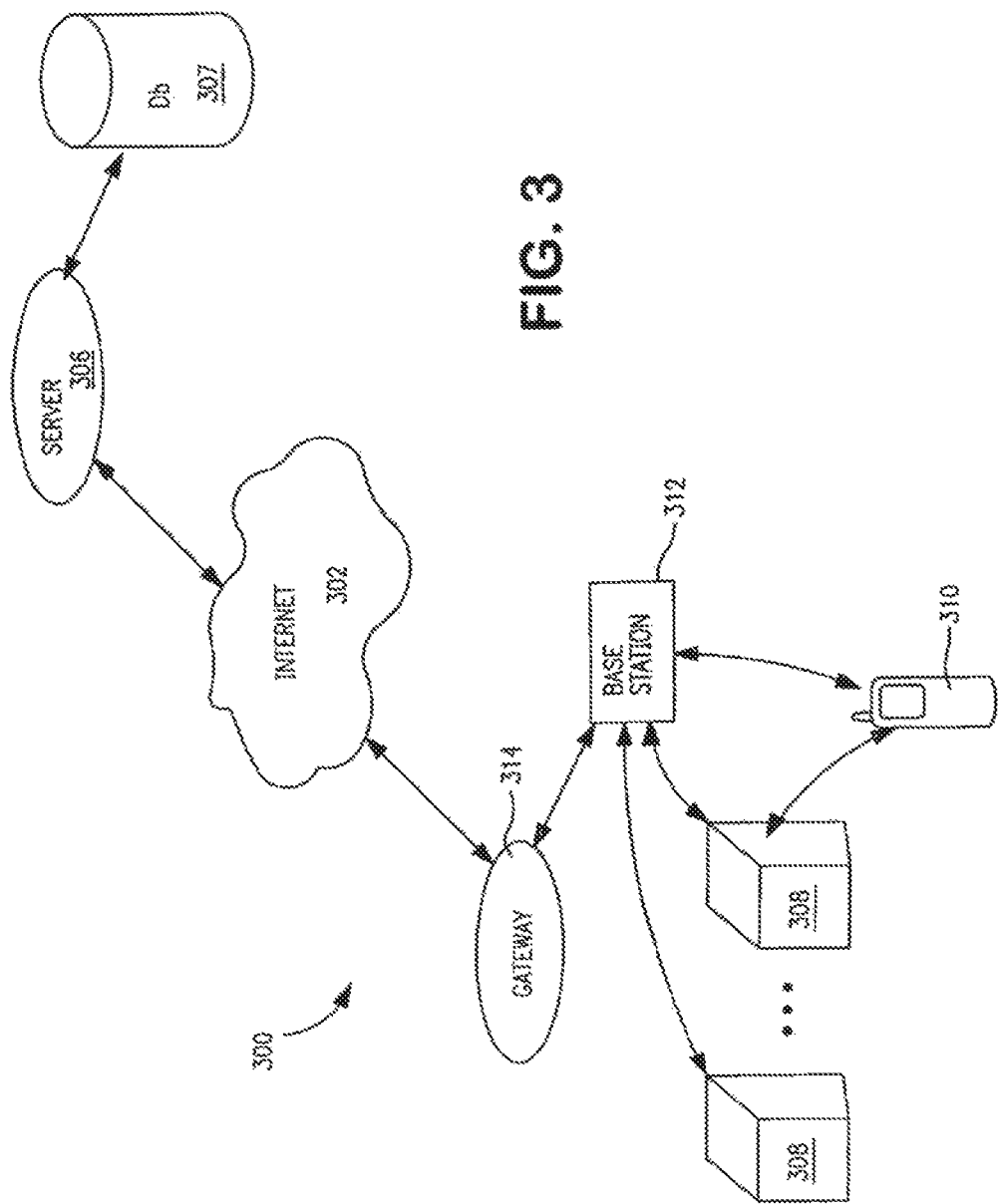
FIG. 3 is a block diagram of another exemplary embodiment of the chattel management system of the invention, adapted for wireless local interface and Internet access of a remote server and database.

As shown in FIG. 3, the Internet or other internet/intranet is used as the basis for one embodiment of the "backbone" of the system 300. The system 300 includes, for example, a backend server 306, a plurality of "front end" kiosk devices 308, including one or more mobile WAP-enabled wireless devices 310, the kiosks interfaced through a wireless base station 312 and WAP gateway 314 of the type well known in the art, the latter being in data communication with the Internet 302. The WAP associated WTLS security protocols may also be employed if desired. Clearly, the use of WAP and a wireless topology in this embodiment is merely illustrative.

The Internet 302 advantageously makes use of the well known and generally ubiquitous TCP/IP protocol, thereby assuring compatibility and access by a wide variety of existing client devices. The server 306 is coupled to a database 307 which provides, inter alfa, storage of user-related data and information such as personal information, statistics, security information, credit card information, etc. It will be recognized that multiple database entities may be used, such multiple entities being either co-located or disparate. The database 307 may also be functionally (as opposed to physically) partitioned and firewalled, such that various types of data are restricted from access by certain entities. Additionally, the POD kiosks 308 may coupled directly to the Internet, LAN, WAN, MAN, intranet, etc. via a service provider 332 (dedicated or otherwise).

The kiosks 308 may include for example audio-visual apparatus such as an H.323-complaint protocol suite adapted for transfer of audio-visual data between the user and a customer service agent 336, whereby the user and agent can communicate audibly (such as via VoIP software installed on the Kiosk and agent terminal) and visually to complete the transaction. Alternatively, the kiosk 308 can be configured with speech recognition software of the type now well known in the art to convert audible speech by the user to text or other data which is then utilized by the distant end to accomplish any number of functions such as chattel deposit and routing, providing on-demand information, etc. A text-to-speech (TTS) capability may also be employed, wherein pre-stored or dynamically generated data files may be converted to audible speech at the kiosk. Alternatively, pre-stored CELP or similar compressed speech data files may be decompressed and played at the Kiosk to provide audio information.

A capacitive or other type of touch screen is optionally provided as an input device, with the display of the kiosk 308 (not shown) acting as both a display device and an input device, thereby simplifying the user interface.

In another embodiment, a peer-to-peer arrangement (either aided by a network agent or server, or true P2P) may be used as the model for communications between entities, whether customer-to-carrier, customer-to-customer, carrier-to-carrier, etc.). It is even envisioned that a user-based bidding or barter system may be established, such as where users may place bids on unclaimed chattels (somewhat akin to the prior art "eBay" paradigm), or barter between themselves via P2P to exchange chattels. For example, a user unable to carry a given chattel on an aircraft may invoke a P2P session over their WiFi link, and solicit a bid for the chattel form another party on say, an incoming aircraft or waiting to pick up a passenger in the terminal. The selling user can then deposit the chattel in a nearby kiosk as described elsewhere herein, and the purchaser can be electronically enabled to access the chattel after payment is made. Hence, the kiosk can act as an electronic transaction arbiter and temporary storage location, for a fee to be extracted from the seller or buyer (or both). The particular kiosk where the chattel is deposited can also be readily identified to the purchaser via their PED or other means, such as a page to their cell phone, etc. A user can also reroute their chattel to another location after deposit. These transactions can also be conducted via cell phone if desired, again with the kiosk or system 100 acting as the intermediary for the transaction.

It will be recognized that myriad different audio, display, and input technologies may be utilized consistent with the invention to transfer information between the user and the "agent" of the carrier.

Furthermore, the term "kiosk" is not limited to any particular physical layout, location, or arrangement. For example, a kiosk may be fixed or mobile, stand-alone or as part of another structure or component, indoor or outdoor, etc.

Also, the kiosks or their components also need not be in one physical location; rather a "virtual" kiosk scattered at various locations throughout the POD for example is envisaged, acting electronically as one kiosk. In this fashion, data received and actions taken by various different physical kiosks can be coordinated and/or analyzed as desired.

Furthermore, the kiosks of the present invention(s) need not be fixed, but may also be mobile, such as where they are mounted on vehicles which are roving in nature. In one variant, an airport cart is configured with a mobile kiosk with secure WiFi or UWB link; the driver drives the cart to different security locations periodically to pick up chattels from users (or merely allow them to interact with the kiosk as previously described herein), or even for incidental user contact, much the way one waves down a taxicab.

As yet another option, the interface between the shipping agent or its proxy and the user may be implemented using a virtual private network (VPN) of the type well known in the art, which provided secure end-to-end communications between two or more points via an untrusted network such as the Internet. This embodiment may be implemented via the aforementioned WAP/WTLS technology suite and associated protocol stacks, through a dedicated or shared RADIUS server and tunneled packets, or any other comparable arrangement capable of restricting access to the transmissions, database or other repositories of information to only authorized personnel. Use of such security technology may be an important criteria in certain contexts, since users may want to have their personal data (i.e., identity, place of residence, credit card information, etc.) maintained in strict confidence to avoid any fear of surreptitious theft and use of this information without authorization (e.g., "identity theft"), or attempts to interfere with the delivery of the shipping element at or near its destination.

The Internet may also advantageously be used as a medium for receipt of shipment requests or solicitation of new prospective participants, in that a URL (e.g., designating a worldwide website) may be used to provide information, receive data, requests for additional information, etc. Furthermore, meta-tags embedded in the site will key Internet search engines to locate the site upon the initiation of an appropriate search using an Internet search engine (such as Yahoo!, GoogleTM, etc.). In one embodiment, an applet or comparable browser mechanism is initiated upon such search, the applet being configured to alert the user to the existence of the URL/website when a search having appropriate parameters is initiated.

It will be appreciated that the chattel transport services described herein may also be provided in conjunction with other services, whether related or not. For example, chattels may be stored (either at the POD or another location) for a finite period of time at the user's request, somewhat like an airport or bus terminal locker. In one variant, the transport destination may be designated as OPOD (original POD), such that the user can merely pay for the storage of his/her chattel, and then recover it at a later time, such as upon the completion of their return flight. Others may also be authorized to access the storage facility/receptacle, such as family members, etc.

Other services may comprise, e.g., cleaning, repair, maintenance, testing, etc. of the chattel, registration in a database, etc. The user may also be presented with POS (point of sale) options at the POD for these or other goods/services, such as flight insurance, chattel shipment insurance, MP3 or music downloads, or even carrier-authorized replacement chattels for those being surrendered by the user.

It is also noted that the various tracking or marking mechanisms described herein (i.e., RFID, bar codes, magnetic strips, etc.) are not exclusive of one another, and in fact may be used together to advantage, such as to perform different functions at different points throughout the processing or transit chain of the chattels. For example, the RFID tagging approach may be more suitable to one portion of the chain (such as user interface at the kiosk), whereas magnetic media may be more desirable for other processing tasks. These different media may also be made selectively removable if desired, so that a chattel or shipping element 104 can be "marked" and "unmarked" if desired during processing, delivery, security scanning, etc. Encodings used on the shipping elements can also be made human readable if desired to facilitate such processing.

It should be recognized that while the foregoing discussion of the various aspects of the invention has described specific sequences of steps necessary to perform the methods of the present invention, other sequences of steps may be used depending on the particular application. Specifically, additional steps may be added, and other steps deleted as being optional. Furthermore, the order of performance of certain steps may be permuted, and/or performed in parallel with other steps. Hence, the specific methods disclosed herein are merely exemplary of the broader methods of the invention.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The described embodiments are to be considered in all respects only illustrative and not restrictive. The scope of the invention is, therefore, indicated by the appended claims rather than the foregoing description. All changes that come within the meaning and range of equivalence of the claims are to embraced within their scope.

What is claimed is:

1. A method of operating a data network computerized server apparatus to enable provision of one or more user-specific services to each of a plurality of users, the computerized server apparatus comprising at least one computer program operative to be executed thereon, and one or more data network interfaces configured to communicate data with one or more data networks, the method comprising:

utilizing the at least one computer program to receive, via the at least one data network interface, and sent from respective mobile wireless-enabled user devices, respective data enabling identification of respective user-specific accounts accessible by the data network computerized server apparatus;

utilizing the at least one computer program to receive, via the at least one network interface, and sent from the respective mobile wireless-enabled user devices, respective data messages comprising location-related data, the respective location-related data (i) obtained by respective ones of mobile wireless-enabled user devices, and (ii) relating to a destination for provision of respective ones of the one or more user-specific services;

utilizing the at least one computer program to cause accessing of data within the respective user-specific accounts, the accessed data identifying respective ones of transportation modalities for provision of the respective user-specific services, the accessing data within the respective user-specific accounts based at least in part on the respective data enabling identification of the respective user-specific accounts;

utilizing the at least one computer program to generate a plurality of data messages for transmission to the respective ones of the transportation modalities, the data messages each comprising at least a portion of the respective location-related data; and utilizing the at least one computer program to cause transmission of the plurality of data messages to the respective transportation modalities via at least the at least one network interface, the data messages each configured to at least enable provision of the respective user-specific service for the respective user at the respective destination.

2. The method of claim 1, wherein said accessing of data within the respective user-specific accounts, the accessed data identifying respective ones of transportation modalities, comprises accessing data identifying respective ones of cars.

3. The method of claim 2, wherein:
said enabling provision of one or more user-specific services to each of a plurality of users comprises the computerized server apparatus acting as an automated network proxy for each of the transportation modalities without the respective users having to establish contact with the respective transportation modalities directly; and
said enabling provision of the one or more services further comprises enabling movement of the respective transportation modalities to the respective destinations by virtue of possessing the respective location-related data.

4. The method of claim 1, wherein the respective location-related data obtained by respective ones of the mobile wireless-enabled user devices comprises location-related data obtained by utilizing a respective application computer program operative to run on the respective ones of the mobile wireless-enabled user devices to access a Global Positioning System (GPS) receiver of the respective mobile wireless-enabled user devices.

5. The method of claim 1, wherein the respective location-related data obtained by respective ones of the mobile wireless-enabled user devices comprises location-related data obtained by utilizing a respective application computer program operative to run on the respective ones of the mobile wireless-enabled user devices to communicate data with a respective computerized kiosk apparatus, the data communication with the respective computerized kiosk apparatus comprising access of an application computer program operative to run on the computerized kiosk apparatus and receive user inputs via the computerized kiosk apparatus.

6. The method of claim 1, wherein the respective location-related data obtained by respective ones of the mobile wireless-enabled user devices comprises location-related data obtained by utilizing a respective application computer program operative to run on the respective ones of the mobile wireless-enabled user devices to communicate data with a respective network-based account of the respective user accessed via a respective computerized kiosk apparatus, the data communication with the network-based account comprising accessing a server apparatus using at least the respective application computer program.

7. The method of claim 1, wherein the respective mobile wireless-enabled user devices each comprise at least one application computer program configured for communication with a network server apparatus, and the method further comprises conducting respective authentication processes each comprising:
using the network server apparatus to authenticate said application computer program of the respective mobile wireless-enabled user device; and
using said network server apparatus to enable authentication of said network server apparatus by the respective one of said application computer programs.

8. The method of claim 7, further comprising establishing respective sessions between the network server apparatus and the respective application computer programs so as to protect sensitive data relating to respective ones of the plurality of users or accounts during transmission between the network server apparatus and the respective mobile wireless-enabled user devices, the sessions established according to at least one of: (i) a transport layer security (TLS) protocol; and/or (ii) a secure sockets layer security (SSL) protocol.

9. The method of claim 8, wherein the network server apparatus comprises the data network computerized server apparatus, and the application computer program comprises a program rendered in at least a Java-based programming language.

10. The method of claim 8, wherein said using the network server apparatus to authenticate said application computer programs of the respective mobile wireless-enabled user devices comprises at least the network server apparatus using a challenge-based approach utilizing at least one random data value.

11. The method of claim 7, wherein said using the network server apparatus to authenticate said application computer programs of the respective mobile wireless-enabled user devices comprises at least the network server apparatus using a challenge-based approach utilizing at least one random data value.

12. The method of claim 1, further comprising:
subsequently generating using the computerized server apparatus respective electronic mail or messages to respective ones of third parties, the respective third parties having been previously designated by the respective users via at least their respective accounts, the generated electronic mail or message comprising at least information relating to: (i) at least one of a date and/or time the respective user-specific service is to performed, and (ii) information relating to the respective destination.

13. The method of claim 1, wherein the respective mobile wireless-enabled user devices each comprise at least one application computer program configured for communication with a network server apparatus, and the method further comprises further comprising:
establishing respective sessions between the network server apparatus and the respective application computer programs so as to protect sensitive data relating to respective ones of the plurality of users or accounts during transmission between the network server apparatus and the respective mobile wireless-enabled user devices, the sessions utilizing at least one pre-formatted package of data packets necessary to enable a one-button transmit functionality, the data packets encapsulated according to at least one application layer security protocol.

14. A method of operating a computerized network apparatus to automatically enable provision of one or more services to each of a plurality of users each having respective mobile wireless-enabled user devices with application computer programs operative to run thereon, the computerized network apparatus comprising at least one computer program operative to be executed thereon, and one or more network interfaces configured to communicate data with at least one data network, the method comprising:
utilizing the at least one computer program to conduct authentication processes with the respective mobile wireless-enabled user devices, the authentication processes each comprising: (i) using the computerized network apparatus to authenticate said application computer program of the respective mobile wireless-enabled user device; and (ii) using said computerized network apparatus to enable authentication of said computerized network apparatus by said application computer program of the respective mobile wireless-enabled user device, the authentication processes each conducted as part of one or more sessions established according to at least one of: (a) a transport layer security (TLS) protocol; and/or (b) a secure sockets layer security (SSL) protocol, at least one of the (i) using the computerized network apparatus to authenticate said application computer program of the respective mobile wireless-enabled user device, and/or (ii) using said computerized network apparatus to enable authentication of said computerized network apparatus by said application computer program, comprising use of a challenge-based approach utilizing at least one random data value;

utilizing the at least one computer program to receive, via the at least one data network interface, respective data enabling identification of respective user-specific accounts accessible by the computerized network apparatus, the respective data enabling identification of respective user-specific accounts having been transmitted to the computerized network apparatus by the respective application computer programs operative to run on the respective mobile wireless-enabled user devices, the respective transmissions each in response to a user touch-screen input via a soft function key (SFK) input function of the respective application computer program;

utilizing the at least one computer program to cause accessing of data within the respective user-specific accounts, the accessed data enabling communication with respective ones of transportation modalities for provision of the respective user-specific services, the accessing data within the respective user-specific accounts based at least in part on the respective data enabling identification of the respective user-specific accounts;

utilizing the at least one computer program to receive, via the at least one network interface, respective location-related data, the respective location-related data: (i) obtained by respective ones of the mobile wireless-enabled user devices using the respective application computer program thereof, and (ii) relating to a geographic destination location for the user or at least one chattel thereof;

utilizing the at least one computer program to generate a plurality of data messages for transmission to respective ones of the transportation modalities, the data messages each comprising at least a portion of the respective location-related data; and utilizing the at least one computer program to cause transmission of the data messages to the respective ones of the transportation modalities via at least the at least one network interface, the provision of the respective data messages enabling subsequent movement of the respective transportation modalities to the respective destinations.

15. The method of claim 14, wherein the utilizing the at least one computer program to cause transmission of the data messages to the respective ones of the transportation modalities via at least the at least one network interface comprises utilizing at least one third-party wireless service provider for provision of the data messages to the respective transportation modalities, said transmission of the data messages each comprising transmission via a wireless interface utilizing an OFDM (orthogonal frequency division multiplexed) protocol, the OFDM protocol comprising transmission via a plurality of radio frequency carriers, and via a plurality of different time periods, so as to at least mitigate interference with other radio frequency communications devices within a same frequency band.

16. The method of claim 14, wherein:
said automatically enabling provision of one or more user-specific services to each of a plurality of users comprises the computerized network apparatus acting as an automated network proxy for each of the transportation modalities without the respective users having to establish contact with the respective transportation modalities directly; and said enabling provision of the one or more services further comprises enabling movement of the respective transportation modalities to the respective destinations by virtue of possessing the respective location-related data.

17. The method of claim 14, wherein the respective location-related data obtained by respective ones of the mobile wireless-enabled user devices comprises location-related data obtained by utilizing the respective application computer program to access a Global Positioning System (GPS) receiver of the respective mobile wireless-enabled user device.

18. The method of claim 14, wherein the respective location-related data obtained by respective ones of the mobile wireless-enabled user devices comprises location-related data obtained by utilizing the respective application computer program to communicate data with a respective computerized kiosk apparatus, the data communication with the respective computerized kiosk apparatus comprising access of an application computer program operative to run on the computerized kiosk apparatus and receive user speech inputs via the computerized kiosk apparatus.

19. The method of claim 14, wherein the respective location-related data obtained by respective ones of the mobile wireless-enabled user devices comprises location-related data obtained by utilizing the respective application computer program operative to run on the respective ones of the mobile wireless-enabled user devices to communicate data with a respective network-based account of the respective user to obtain the location-related data, the location-related data having been provided to the network-based account via a respective computerized kiosk apparatus, the data communication with the network-based account comprising communicating data with a server apparatus using at least the respective application computer program.

20. A method of operating a mobile computerized apparatus of a user having an application computer program operative to run thereon, and a wireless data interface, the method to automatically enable provision of one or more user-specific services associated with a land vehicle, the one or more user-specific services being provided based at least on a user-specific account maintained at least in part in a secure network storage location, the method comprising:

establishing, via at least the application computer program, a secure data communications session between the mobile computerized apparatus and a network server apparatus, the secure data communications session established based at least on data provided to the network server apparatus by the mobile computerized apparatus and relating to the user-specific account, the network server apparatus configured to access the secure network storage location to access the user-specific account based at least in part on the data provided to the network server apparatus by the mobile computerized apparatus and relating to the user-specific account;

receiving at the mobile computerized apparatus, via at least the application computer program and the wireless data interface, data relating to a user-specified geographic location or address, the data relating to the user-specified geographic location or address having been obtained from the user via at least a computerized kiosk apparatus disposed at a point of travel departure for the user; and automatically causing transmission of at least the data relating to the user-specified geographic location or address to the network server apparatus via at least the wireless data interface and the established data communications session;

wherein the transmitted data relating to the user-specified geographic location or address enables automatic forwarding by the network server apparatus to an electronic address previously designated within the user-specific account, the automatic forwarding to enable provision of the one or more user-specific services associated with the land vehicle; and wherein the one or more user-specific services associated with the land vehicle comprise movement of the land vehicle to the user-specified geographic location or address.

21. The method of claim 20, wherein the establishing, via at least the application computer program, the secure data communications session between the mobile computerized apparatus and the network server apparatus, comprises utilizing the application computer program to conduct an authentication process with the network server apparatus, the authentication process comprising: (i) using the network server apparatus to authenticate said application computer program of the mobile computerized apparatus; and (ii) using said network server apparatus to enable authentication of said network server apparatus by said application computer program, the authentication process conducted according to at least one of: (a) a transport layer security (TLS) protocol; and/or (b) a secure sockets layer security (SSL) protocol, at least one of the (i) using the network server apparatus to authenticate said application computer program, and/or (ii) using said network server apparatus to enable authentication of said network server apparatus by said application computer program, comprising use of a challenge-based approach utilizing at least one random data value.

22. The method of claim 20, wherein the causing transmission of at least the data relating to the user-specified geographic location or address to the network server apparatus via at least the wireless data interface comprises causing transmission via an OFDM (orthogonal frequency division multiplexed) protocol, the OFDM protocol comprising transmission via a plurality of radio frequency carriers, and via a plurality of different time periods, so as to at least mitigate interference with other radio frequency communications devices within a same frequency band.

23. The method of claim 20, wherein the application computer program comprises a computer program rendered in a Java-based programming language, and the method further comprises downloading the application computer to the mobile computerized apparatus.

24. The method of claim 20, further comprising establishing a communications session between the mobile computerized apparatus and the computerized kiosk apparatus over at least a wireless interface of the computerized kiosk apparatus and the wireless data interface.

25. A method of providing a user-specific service to a user via at least a mobile computerized electronic apparatus such that the user does not need to know an address of a location where the mobile computerized electronic apparatus is presently located, the user-specific service being provided based at least on a user-specific account maintained at least in part in a secure network storage location, the mobile computerized electronic apparatus comprising at least:

a digital processing apparatus comprising at least one integrated circuit (IC);

a global positioning system (GPS)-based receiver apparatus configured to generate location-related data;

a wireless interface in data communication with the digital processing apparatus; and a storage device comprising at least one IC with at least one computer program stored thereon, the storage device in data communication with the digital processing apparatus;

wherein the method comprises:

utilizing the at least one computer program to receive location-related data, the location-related data generated by the GPS-based receiver apparatus based on a then-current location of the mobile computerized electronic apparatus;

utilizing the at least one computer program to automatically generate at least one electronic message for transmission to a network server apparatus, the at least one electronic message comprising at least a portion of the location-related data based on the then-current location; and utilizing the at least one computer program to automatically cause transmission of the at least one electronic message to the network server apparatus via at least the wireless interface.

26. The method of claim 25, further comprising establishing, via at least the at least one computer program, a secure data communications session between the mobile computerized electronic apparatus and the network server apparatus, the secure data communications session established based at least on data relating to the mobile computerized electronic apparatus and obtained via the user-specific account, the network server apparatus configured to access the secure network storage location to access the user-specific account based at least in part on the data provided to the network server apparatus by the user;

wherein the utilizing the at least one computer program to automatically cause transmission of the at least one electronic message to the network server apparatus via at least the wireless interface comprises automatically causing transmission of the at least one electronic message via the secure data communications session.

27. The method of claim 26, wherein the establishing the secure data communications session between the mobile computerized electronic apparatus and the network server apparatus, comprises utilizing the at least one computer program to conduct an authentication process with the network server apparatus, the authentication process comprising at least one of: (i) using the network server apparatus to authenticate said at least one computer program of the mobile computerized electronic apparatus; and/or (ii) using said network server apparatus to enable authentication of said network server apparatus by said at least one computer program, the authentication process conducted according to at least one of: (a) a transport layer security (TLS) protocol; and/or (b) a secure sockets layer security (SSL) protocol, at least one of the (i) using the network server apparatus to authenticate said at least one computer program, and/or (ii) using said network server apparatus to enable authentication of said network server apparatus by said at least one computer program, comprising use of a challenge-based approach utilizing at least one random data value.

28. The method of claim 25, wherein the network server apparatus is configured to act as a data communications proxy for a plurality of different mobile computerized electronic apparatus associated with different users;
- wherein the user-specific service comprises a data transmission service, the data transmission service performed for the user at a location different than a current location of the user, the data transmission service comprising at least the utilizing the at least one computer program to automatically cause transmission of the at least one electronic message to the network server apparatus via at least the wireless interface; and
- the at least one electronic message comprises a preformatted package of data packets encapsulated according to at least one application layer security protocol; and
- wherein the causing transmission of the at least one electronic message via at least the wireless interface comprises causing transmission of the encapsulated data packets via a cellular wireless interface comprising at least one of a Third Generation Project Partnership (3GPP) compliant interface and/or an interface utilizing an orthogonal frequency division multiplexing (OFDM) modulation scheme.

29. The method of claim 25, wherein:
- the mobile computerized electronic apparatus further comprises a capacitive touch-screen input and display device in data communication with the digital processing apparatus;
- the at least one computer program is configured to generate one or more soft function keys on a display of the capacitive touch screen input and display device, the one or more soft function keys enabling the user to provide an operator input by way of one or more touches of one or more areas of the display corresponding to respective ones the one or more soft functions keys; and
- the utilizing the at least one computer program to receive location-related data, the location-related data generated by the GPS-based receiver apparatus based on a then-current location of the mobile computerized electronic apparatus, comprises causing the at least one computer program to receive location-related data in response to a user-generated request or input.

30. The method of claim 25, further comprising establishing, via at least the at least one computer program, a secure data communications session between the mobile computerized electronic apparatus and the network server apparatus, the secure data communications session established based at least on data relating to the mobile computerized electronic apparatus and obtained via the user-specific account, the network server apparatus configured to access the secure network storage location to access the user-specific account based at least in part on the data provided to the network server apparatus by the user, the establishing the secure data communications session between the mobile computerized electronic apparatus and the network server apparatus, comprises utilizing the at least one computer program to conduct an authentication process with the network server apparatus, the authentication process comprising at least one of: (i) using the network server apparatus to authenticate said at least one computer program of the mobile computerized electronic apparatus; and/or (ii) using said network server apparatus to enable authentication of said network server apparatus by said at least one computer program, the authentication process conducted according to at least one of: (a) a transport layer security (TLS) protocol; and/or (b) a secure sockets layer security (SSL) protocol, at least one of the (i) using the network server apparatus to authenticate said at least one computer program, and/or (ii) using said network server apparatus to enable authentication of said network server apparatus by said at least one computer program, comprising use of a challenge-based approach utilizing at least one random data value; and
wherein:
- the utilizing the at least one computer program to automatically cause transmission of the at least one electronic message to the network server apparatus via at least the wireless interface comprises automatically causing transmission of the at least one electronic message via the secure data communications session;
- the network server apparatus is configured to act as a data communications proxy for a plurality of different mobile computerized electronic apparatus associated with different users;
- the user-specific service comprises a data transmission service, the data transmission service performed for the user at a location different than a current location of the user, the data transmission service comprising at least the utilizing the at least one computer program to automatically cause transmission of the at least one electronic message to the network server apparatus via at least the wireless interface, the causing transmission of the at least one electronic message via at least the wireless interface comprising causing transmission via a cellular wireless interface comprising at least one of a Third Generation Project Partnership (3GPP) compliant interface and/or an interface utilizing an orthogonal frequency division multiplexing (OFDM) modulation scheme;
- the mobile computerized electronic apparatus further comprises a capacitive touch-screen input and display device in data communication with the digital processing apparatus, and the at least one computer program is configured to generate one or more soft function keys on a display of the capacitive touch screen input and display device, the one or more soft function keys enabling the user to provide an operator input by way of one or more touches of one or more areas of the display corresponding to respective ones the one or more soft functions keys; and
- the utilizing the at least one computer program to receive location-related data, the location-related data generated by the GPS-based receiver apparatus based on a then-current location of the mobile computerized electronic apparatus, comprises causing the at least one computer program to receive location-related data in response to a user-generated request or input.

* * * * *

UNITED STATES PATENT AND TRADEMARK OFFICE
CERTIFICATE OF CORRECTION

PATENT NO. : 9,781,110 B2
APPLICATION NO. : 15/470775
DATED : October 3, 2017
INVENTOR(S) : Mark J. Gazdzinski et al.

It is certified that error appears in the above-identified patent and that said Letters Patent is hereby corrected as shown below:

In the Claims

Currently Reads – Claim 8:
"8. The method of claim 7, further comprising establishing respective sessions between the network server apparatus and the respective application computer programs so as to protect sensitive data relating to respective ones of the plurality of users or accounts during transmission between the network server apparatus and the respective mobile wireless-enabled user devices, the sessions established according to at least one of: (i) a transport layer security (TLS) protocol; and/or (ii) a secure sockets layer security (SSL) protocol."

Should Read:
--8. The method of claim 7, further comprising establishing respective sessions between the network server apparatus and the respective application computer programs so as to protect sensitive data relating to respective ones of the plurality of users or accounts during transmission between the network server apparatus and the respective mobile wireless-enabled user devices, the sessions established according to at least one of: (i) a transport layer security (TLS) protocol; or (ii) a secure sockets layer security (SSL) protocol.--

Currently Reads – Claim 12:
"12. The method of claim 1, further comprising:
subsequently generating using the computerized server apparatus respective electronic mail or messages to respective ones of third parties, the respective third parties having been previously designated by the respective users via at least their respective accounts, the generated electronic mail or message comprising at least information relating to: (i) at least one of a date and/or time the respective user-specific service is to performed, and (ii) information relating to the respective destination."

Should Read:
--12. The method of claim 1, further comprising:

Signed and Sealed this
Twentieth Day of April, 2021

Drew Hirshfeld
*Performing the Functions and Duties of the
Under Secretary of Commerce for Intellectual Property and
Director of the United States Patent and Trademark Office* subsequently generating using the computerized server apparatus respective electronic mail or messages to respective ones of third parties, the respective third parties having been previously designated by the respective users via at least their respective accounts, the generated electronic mail or message comprising at least information relating to: (i) at least one of a date or time the respective user-specific service is to be performed, and (ii) information relating to the respective destination.--

Currently Reads – Claim 14:
"14. A method of operating a computerized network apparatus to automatically enable provision of one or more services to each of a plurality of users each having respective mobile wireless-enabled user devices with application computer programs operative to run thereon, the computerized network apparatus comprising at least one computer program operative to be executed thereon, and one or more network interfaces configured to communicate data with at least one data network, the method comprising:
utilizing the at least one computer program to conduct authentication processes with the respective mobile wireless-enabled user devices, the authentication processes each comprising: (i) using the computerized network apparatus to authenticate said application computer program of the respective mobile wireless-enabled user device; and (ii) using said computerized network apparatus to enable authentication of said computerized network apparatus by said application computer program of the respective mobile wireless-enabled user device, the authentication processes each conducted as part of one or more sessions established according to at least one of: (a) a transport layer security (TLS) protocol; and/or (b) a secure sockets layer security (SSL) protocol, at least one of the (i) using the computerized network apparatus to authenticate said application computer program of the respective mobile wireless-enabled user device, and/or (ii) using said computerized network apparatus to enable authentication of said computerized network apparatus by said application computer program, comprising use of a challenge-based approach utilizing at least one random data value;
utilizing the at least one computer program to receive, via the at least one data network interface, respective data enabling identification of respective user-specific accounts accessible by the computerized network apparatus, the respective data enabling identification of respective user-specific accounts having been transmitted to the computerized network apparatus by the respective application computer programs operative to run on the respective mobile wireless-enabled user devices, the respective transmissions each in response to a user touch-screen input via a soft function key (SFK) input function of the respective application computer program;
utilizing the at least one computer program to cause accessing of data within the respective user-specific accounts, the accessed data enabling communication with respective ones of transportation modalities for provision of the respective user-specific services, the accessing data within the respective user-specific accounts based at least in part on the respective data enabling identification of the respective user-specific accounts;
utilizing the at least one computer program to receive, via the at least one network interface, respective location-related data, the respective location-related data: (i) obtained by respective ones of the mobile wireless-enabled user devices using the respective application computer program thereof, and (ii) relating to a geographic destination location for the user or at least one chattel thereof;
utilizing the at least one computer program to generate a plurality of data messages for transmission to respective ones of the transportation modalities, the data messages each comprising at least a portion of the respective location-related data; and
utilizing the at least one computer program to cause transmission of the data messages to the

CERTIFICATE OF CORRECTION (continued)
U.S. Pat. No. 9,781,110 B2 respective ones of the transportation modalities via at least the at least one network interface, the provision of the respective data messages enabling subsequent movement of the respective transportation modalities to the respective destinations."

Should Read:
--14. A method of operating a computerized network apparatus to automatically enable provision of one or more services to each of a plurality of users each having respective mobile wireless-enabled user devices with application computer programs operative to run thereon, the computerized network apparatus comprising at least one computer program operative to be executed thereon, and one or more network interfaces configured to communicate data with at least one data network, the method comprising:
utilizing the at least one computer program to conduct authentication processes with the respective mobile wireless-enabled user devices, the authentication processes each comprising: (i) using the computerized network apparatus to authenticate said application computer program of the respective mobile wireless-enabled user device; and (ii) using said computerized network apparatus to enable authentication of said computerized network apparatus by said application computer program of the respective mobile wireless-enabled user device, the authentication processes each conducted as part of one or more sessions established according to at least one of: (a) a transport layer security (TLS) protocol; or (b) a secure sockets layer security (SSL) protocol, at least one of the (i) using the computerized network apparatus to authenticate said application computer program of the respective mobile wireless-enabled user device, or (ii) using said computerized network apparatus to enable authentication of said computerized network apparatus by said application computer program, comprising use of a challenge-based approach utilizing at least one random data value;
utilizing the at least one computer program to receive, via the at least one data network interface, respective data enabling identification of respective user-specific accounts accessible by the computerized network apparatus, the respective data enabling identification of respective user-specific accounts having been transmitted to the computerized network apparatus by the respective application computer programs operative to run on the respective mobile wireless-enabled user devices, the respective transmissions each in response to a user touch-screen input via a soft function key (SFK) input function of the respective application computer program;
utilizing the at least one computer program to cause accessing of data within the respective user-specific accounts, the accessed data enabling communication with respective ones of transportation modalities for provision of the respective user-specific services, the accessing data within the respective user-specific accounts based at least in part on the respective data enabling identification of the respective user-specific accounts;
utilizing the at least one computer program to receive, via the at least one network interface, respective location-related data, the respective location-related data: (i) obtained by respective ones of the mobile wireless-enabled user devices using the respective application computer program thereof, and (ii) relating to a geographic destination location for the user or at least one chattel thereof;
utilizing the at least one computer program to generate a plurality of data messages for transmission to respective ones of the transportation modalities, the data messages each comprising at least a portion of the respective location-related data; and
utilizing the at least one computer program to cause transmission of the data messages to the respective ones of the transportation modalities via at least the at least one network interface, the provision of the respective data messages enabling subsequent movement of the respective transportation modalities to the respective destinations.--

CERTIFICATE OF CORRECTION (continued)
U.S. Pat. No. 9,781,110 B2

Currently Reads – Claim 21:
"21. The method of claim 20, wherein the establishing, via at least the application computer program, the secure data communications session between the mobile computerized apparatus and the network server apparatus, comprises utilizing the application computer program to conduct an authentication process with the network server apparatus, the authentication process comprising: (i) using the network server apparatus to authenticate said application computer program of the mobile computerized apparatus; and (ii) using said network server apparatus to enable authentication of said network server apparatus by said application computer program, the authentication process conducted according to at least one of: (a) a transport layer security (TLS) protocol; and/or (b) a secure sockets layer security (SSL) protocol, at least one of the (i) using the network server apparatus to authenticate said application computer program, and/or (ii) using said network server apparatus to enable authentication of said network server apparatus by said application computer program, comprising use of a challenge-based approach utilizing at least one random data value."

Should Read:
--21. The method of claim 20, wherein the establishing, via at least the application computer program, the secure data communications session between the mobile computerized apparatus and the network server apparatus, comprises utilizing the application computer program to conduct an authentication process with the network server apparatus, the authentication process comprising: (i) using the network server apparatus to authenticate said application computer program of the mobile computerized apparatus; and (ii) using said network server apparatus to enable authentication of said network server apparatus by said application computer program, the authentication process conducted according to at least one of: (a) a transport layer security (TLS) protocol; or (b) a secure sockets layer security (SSL) protocol, at least one of the (i) using the network server apparatus to authenticate said application computer program, or (ii) using said network server apparatus to enable authentication of said network server apparatus by said application computer program, comprising use of a challenge-based approach utilizing at least one random data value.--

Currently Reads – Claim 27:
"27. The method of claim 26, wherein the establishing the secure data communications session between the mobile computerized electronic apparatus and the network server apparatus, comprises utilizing the at least one computer program to conduct an authentication process with the network server apparatus, the authentication process comprising at least one of: (i) using the network server apparatus to authenticate said at least one computer program of the mobile computerized electronic apparatus; and/or (ii) using said network server apparatus to enable authentication of said network server apparatus by said at least one computer program, the authentication process conducted according to at least one of: (a) a transport layer security (TLS) protocol; and/or (b) a secure sockets layer security (SSL) protocol, at least one of the (i) using the network server apparatus to authenticate said at least one computer program, and/or (ii) using said network server apparatus to enable authentication of said network server apparatus by said at least one computer program, comprising use of a challenge-based approach utilizing at least one random data value."

Should Read:
--27. The method of claim 26, wherein the establishing the secure data communications session between the mobile computerized electronic apparatus and the network server apparatus, comprises utilizing the at least one computer program to conduct an authentication process with the network server apparatus, the authentication process comprising at least one of: (i) using the network server apparatus to authenticate said at least one computer program of the mobile computerized electronic apparatus; or (ii) using said network server apparatus to enable authentication of said network server apparatus by said at least one computer program, the authentication process conducted according to at least one of: (a) a transport layer security (TLS) protocol; or (b) a secure sockets layer security (SSL) protocol, at least one of the (i) using the network server apparatus to authenticate said at least one computer program, or (ii) using said network server apparatus to enable authentication of said network server apparatus by said at least one computer program, comprising use of a challenge-based approach utilizing at least one random data value.--

Currently Reads – Claim 28:
"28. The method of claim 25, wherein the network server apparatus is configured to act as a data communications proxy for a plurality of different mobile computerized electronic apparatus associated with different users;
wherein the user-specific service comprises a data transmission service, the data transmission service performed for the user at a location different than a current location of the user, the data transmission service comprising at least the utilizing the at least one computer program to automatically cause transmission of the at least one electronic message to the network server apparatus via at least the wireless interface; and the at least one electronic message comprises a pre-formatted package of data packets encapsulated according to at least one application layer security protocol; and
wherein the causing transmission of the at least one electronic message via at least the wireless interface comprises causing transmission of the encapsulated data packets via a cellular wireless interface comprising at least one of a Third Generation Project Partnership (3GPP) compliant interface and/or an interface utilizing an orthogonal frequency division multiplexing (OFDM) modulation scheme."

Should Read:
--28. The method of claim 25, wherein the network server apparatus is configured to act as a data communications proxy for a plurality of different mobile computerized electronic apparatus associated with different users;
wherein the user-specific service comprises a data transmission service, the data transmission service performed for the user at a location different than a current location of the user, the data transmission service comprising at least the utilizing the at least one computer program to automatically cause transmission of the at least one electronic message to the network server apparatus via at least the wireless interface; and the at least one electronic message comprises a pre-formatted package of data packets encapsulated according to at least one application layer security protocol; and
wherein the causing transmission of the at least one electronic message via at least the wireless interface comprises causing transmission of the encapsulated data packets via a cellular wireless interface comprising at least one of a Third Generation Project Partnership (3GPP) compliant interface or an interface utilizing an orthogonal frequency division multiplexing (OFDM) modulation scheme.--

Currently Reads – Claim 30:
"30. The method of claim 25, further comprising establishing, via at least the at least one computer program, a secure data communications session between the mobile computerized electronic apparatus and the network server apparatus, the secure data communications session established based at least on data relating to the mobile computerized electronic apparatus and obtained via the user-specific

CERTIFICATE OF CORRECTION (continued)
U.S. Pat. No. 9,781,110 B2 account, the network server apparatus configured to access the secure network storage location to access the user-specific account based at least in part on the data provided to the network server apparatus by the user, the establishing the secure data communications session between the mobile computerized electronic apparatus and the network server apparatus, comprises utilizing the at least one computer program to conduct an authentication process with the network server apparatus, the authentication process comprising at least one of:

(i) using the network server apparatus to authenticate said at least one computer program of the mobile computerized electronic apparatus; and/or (ii) using said network server apparatus to enable authentication of said network server apparatus by said at least one computer program, the authentication process conducted according to at least one of: (a) a transport layer security (TLS) protocol; and/or (b) a secure sockets layer security (SSL) protocol, at least one of the (i) using the network server apparatus to authenticate said at least one computer program, and/or (ii) using said network server apparatus to enable authentication of said network server apparatus by said at least one computer program, comprising use of a challenge-based approach utilizing at least one random data value; and wherein:

the utilizing the at least one computer program to automatically cause transmission of the at least one electronic message to the network server apparatus via at least the wireless interface comprises automatically causing transmission of the at least one electronic message via the secure data communications session;

the network server apparatus is configured to act as a data communications proxy for a plurality of different mobile computerized electronic apparatus associated with different users;

the user-specific service comprises a data transmission service, the data transmission service performed for the user at a location different than a current location of the user, the data transmission service comprising at least the utilizing the at least one computer program to automatically cause transmission of the at least one electronic message to the network server apparatus via at least the wireless interface, the causing transmission of the at least one electronic message via at least the wireless interface comprising causing transmission via a cellular wireless interface comprising at least one of a Third Generation Project Partnership (3GPP) compliant interface and/or an interface utilizing an orthogonal frequency division multiplexing (OFDM) modulation scheme;

the mobile computerized electronic apparatus further comprises a capacitive touch-screen input and display device in data communication with the digital processing apparatus, and the at least one computer program is configured to generate one or more soft function keys on a display of the capacitive touch screen input and display device, the one or more soft function keys enabling the user to provide an operator input by way of one or more touches of one or more areas of the display corresponding to respective ones the one or more soft functions keys; and the utilizing the at least one computer program to receive location-related data, the location-related data generated by the GPS-based receiver apparatus based on a then-current location of the mobile computerized electronic apparatus, comprises causing the at least one computer program to receive location-related data in response to a user-generated request or input."

Should Read:
--30. The method of claim 25, further comprising establishing, via at least the at least one computer program, a secure data communications session between the mobile computerized electronic apparatus and the network server apparatus, the secure data communications session established based at least on data relating to the mobile computerized electronic apparatus and obtained via the user-specific account, the network server apparatus configured to access the secure network storage location to access the user-specific account based at least in part on the data provided to the network server apparatus by the user, the establishing the secure data communications session between the mobile computerized electronic apparatus and the network server apparatus, comprises utilizing the at least one computer program to conduct an authentication process with the network server apparatus, the authentication process comprising at least one of: (i) using the network server apparatus to authenticate said at least one computer program of the mobile computerized electronic apparatus; or (ii) using said network server apparatus to enable authentication of said network server apparatus by said at least one computer program, the authentication process conducted according to at least one of: (a) a transport layer security (TLS) protocol; or (b) a secure sockets layer security (SSL) protocol, at least one of the (i) using the network server apparatus to authenticate said at least one computer program, or (ii) using said network server apparatus to enable authentication of said network server apparatus by said at least one computer program, comprising use of a challenge-based approach utilizing at least one random data value; and
wherein:
the utilizing the at least one computer program to automatically cause transmission of the at least one electronic message to the network server apparatus via at least the wireless interface comprises automatically causing transmission of the at least one electronic message via the secure data communications session;
the network server apparatus is configured to act as a data communications proxy for a plurality of different mobile computerized electronic apparatus associated with different users;
the user-specific service comprises a data transmission service, the data transmission service performed for the user at a location different than a current location of the user, the data transmission service comprising at least the utilizing the at least one computer program to automatically cause transmission of the at least one electronic message to the network server apparatus via at least the wireless interface, the causing transmission of the at least one electronic message via at least the wireless interface comprising causing transmission via a cellular wireless interface comprising at least one of a Third Generation Project Partnership (3GPP) compliant interface or an interface utilizing an orthogonal frequency division multiplexing (OFDM) modulation scheme;
the mobile computerized electronic apparatus further comprises a capacitive touch-screen input and display device in data communication with the digital processing apparatus, and the at least one computer program is configured to generate one or more soft function keys on a display of the capacitive touch screen input and display device, the one or more soft function keys enabling the user to provide an operator input by way of one or more touches of one or more areas of the display corresponding to respective ones the one or more soft functions keys; and
the utilizing the at least one computer program to receive location-related data, the location-related data generated by the GPS-based receiver apparatus based on a then-current location of the mobile computerized electronic apparatus, comprises causing the at least one computer program to receive location-related data in response to a user-generated request or input.--